US012635784B1

(12) United States Patent
Hu

(10) Patent No.: US 12,635,784 B1
(45) Date of Patent: May 26, 2026

(54) WATER CUP WITH FAN

(71) Applicant: Quan Hu, Guangzhou (CN)

(72) Inventor: Quan Hu, Guangzhou (CN)

( * ) Notice: Subject to any disclaimer, the term of this patent is extended or adjusted under 35 U.S.C. 154(b) by 0 days.

(21) Appl. No.: 19/343,057

(22) Filed: Sep. 29, 2025

Related U.S. Application Data

(63) Continuation of application No. PCT/CN2025/121435, filed on Sep. 15, 2025.

(30) Foreign Application Priority Data

Aug. 15, 2025 (CN) ......................... 202530483442.5
Aug. 15, 2025 (CN) ........................ 202530483443.X

(51) Int. Cl.

| | |
|---|---|
| ***A45F 3/18*** | (2006.01) |
| ***F04D 25/08*** | (2006.01) |
| ***F04D 29/52*** | (2006.01) |
| ***F04D 29/64*** | (2006.01) |
| ***F21V 33/00*** | (2006.01) |
| *A45F 3/00* | (2006.01) |

(52) U.S. Cl.
CPC .............. *A45F 3/18* (2013.01); *F04D 25/084* (2013.01); *F04D 29/522* (2013.01); *F04D 29/646* (2013.01); *F21V 33/0024* (2013.01); *F21V 33/0096* (2013.01); *A45F 2003/003* (2013.01)

(58) Field of Classification Search
CPC .... A45F 3/18; A45F 2003/003; F04D 25/084; F04D 29/522; F04D 29/646; F21V 33/0024; F21V 33/0096
See application file for complete search history.

(56) References Cited

U.S. PATENT DOCUMENTS

D387,422 S * 12/1997 Radtke ......................... D23/382
D395,701 S * 6/1998 Radtke ......................... D23/378
6,217,294 B1 * 4/2001 Arnieri .................. B65D 81/36 222/135
6,827,290 B2 * 12/2004 Zimmerman ........... B05B 15/62 239/289
11,466,894 B1 * 10/2022 Perrelle .................. F16M 11/10
11,629,869 B1 * 4/2023 Barlettano ................ F24F 6/16 62/176.6
2008/0295220 A1 * 12/2008 Webb ..................... A42B 1/008 2/410

* cited by examiner

*Primary Examiner* — Nathaniel E Wiehe
*Assistant Examiner* — Aye S Htay
(74) *Attorney, Agent, or Firm* — HOWARD M COHN and Associates, LLC

(57) ABSTRACT

The present disclosure provides a water cup with a fan. The water cup with the fan includes a cup body and a fan assembly. The cup body includes a bottom plate and a side wall structure connected to the bottom plate. The bottom plate and the side wall structure are enclosed to an accommodating cavity with an opening. The fan assembly can be detachably arranged on an outer surface of the side wall structure. The water cup with the fan not only has a water storage function through the cup body, but also has a cooling function based on the design of the fan assembly. The water cup has diverse functions.

18 Claims, 41 Drawing Sheets

WATER CUP WITH FAN

CROSS-REFERENCE TO RELATED APPLICATIONS

This application is a continuation of International Application No. PCT/CN2025/121435, filed on Sep. 15, 2025, and also claims priorities of Chinese patent applications CN202530483443.X and CN202530483442.5, both filed on Aug. 15, 2025, the entire contents of which are incorporated herein by references.

TECHNICAL FIELD

The present disclosure relates to the technical field of water cups, and in particular, to a water cup with a fan.

BACKGROUND

With the improvement of the living standard, there are increasingly high requirements for use of daily necessities such as a water cup.

At present, water cups on the market are usually ordinary water cups and water cups with heat insulation functions (i.e. insulated cups). The ordinary water cups are only configured to store liquid, while the insulated cups can implement heat insulation on the liquid stored in it. In this way, the water cup has a single function. Therefore, how to design a multifunctional water cup has become a problem needing to be solved urgently.

SUMMARY

Embodiments of the present disclosure provide a water cup with a fan, which can solve the problem that the water cup has a single function in the related art.

The present disclosure provides a water cup with a fan. The water cup with the fan includes a cup body and a fan assembly. The cup body includes a bottom plate and a side wall structure connected to the bottom plate. The bottom plate and the side wall structure are enclosed to an accommodating cavity with an opening. The fan assembly can be detachably arranged on an outer surface of the side wall structure.

Based on the water cup with the fan in this embodiment, by designing the bottom plate and the side wall structure, the bottom plate and the side wall structure are enclosed into the accommodating cavity with the opening, and water can be injected into the cup body from the opening of the accommodating cavity. By designing the fan assembly, a user can use the fan assembly for cooling. The fan assembly is designed to be detachably connected to the side wall structure, so that the user can remove the fan assembly from the side wall structure according to an actual need, making the fan assembly be as close to human skin as possible to enhance a cooling effect. In addition, when the fan assembly or the cup body is damaged separately, the fan assembly or the cup body can be replaced separately, without replacing the entire water cup with the fan. This can reduce a waste of resources. The water cup with the fan not only has a water storage function through the cup body, but also has a cooling function based on the design of the fan assembly. The water cup has diverse functions.

BRIEF DESCRIPTION OF THE DRAWINGS

In order to explain the technical solutions of the embodiments of the present invention more clearly, the following will briefly introduce the accompanying drawings used in the embodiments. Apparently, the drawings in the following description are only some embodiments of the present invention. Those of ordinary skill in the art can obtain other drawings based on these drawings without creative work.

Numerals in the accompanying drawings: 1: water cup with a fan; 10: cup body; 11: bottom plate; 12: side wall structure; 121: side wall body; 121*a*: accommodating cavity; 122: fan mounting member; 122*a*: storage slot; 122*b*: storage main body part; 122*c*: extension part; 1221: mounting body; 1221*a*: first part; 1221*a*1: through hole; 1221*b*: second part; 1221*b*1: first movable slot; 1221*b*2: second movable slot; 1221*b*3: movable hole; 1222: locking assembly; 1222*a*: lock catch; 1222*a*1: operating part; 1222*a*2: latching part; 1222*a*3: assembling part; 1222*b*: resetting driving member; 1222*b*1: elastic member; 123: connection part; 123*a*: protrusion; 123*b*: groove; 20: fan assembly; 20*a*: buckling slot; 21: base; 211: housing; 211*a*: surface; 212: battery; 213: circuit board; 214: control button; 215: charging port member; 216: lighting device; 217: supporting base; 218: handle; 219: rubber plug; 22: fan head; 23: elastic pad; 30: cup lid assembly; 31: main lid body; 32: flip lid; 33: straw structure; 34: sealing ring; 40: magnetic attraction structure; 41: first magnet; 42: second magnet; 50: buckle structure; 51: clamping flange; 52: clamping slot; 61: external thread; 62: internal thread; 70: spraying assembly; 71: nozzle structure; 711: nozzle; 712: pressing handle; and 72: limiting member.

DETAILED DESCRIPTION OF THE EMBODIMENTS

The technical solutions in the embodiments of the present invention will be clearly and completely described below in conjunction with the accompanying drawings in the embodiments of the present invention. Apparently, the described embodiments are only a part of the embodiments of the present invention, rather than all the embodiments. Based on the embodiments in the present invention, all other embodiments obtained by those ordinarily skilled in the art without doing creative work shall fall within the protection scope of the present invention.

Embodiment I

Figure 1:
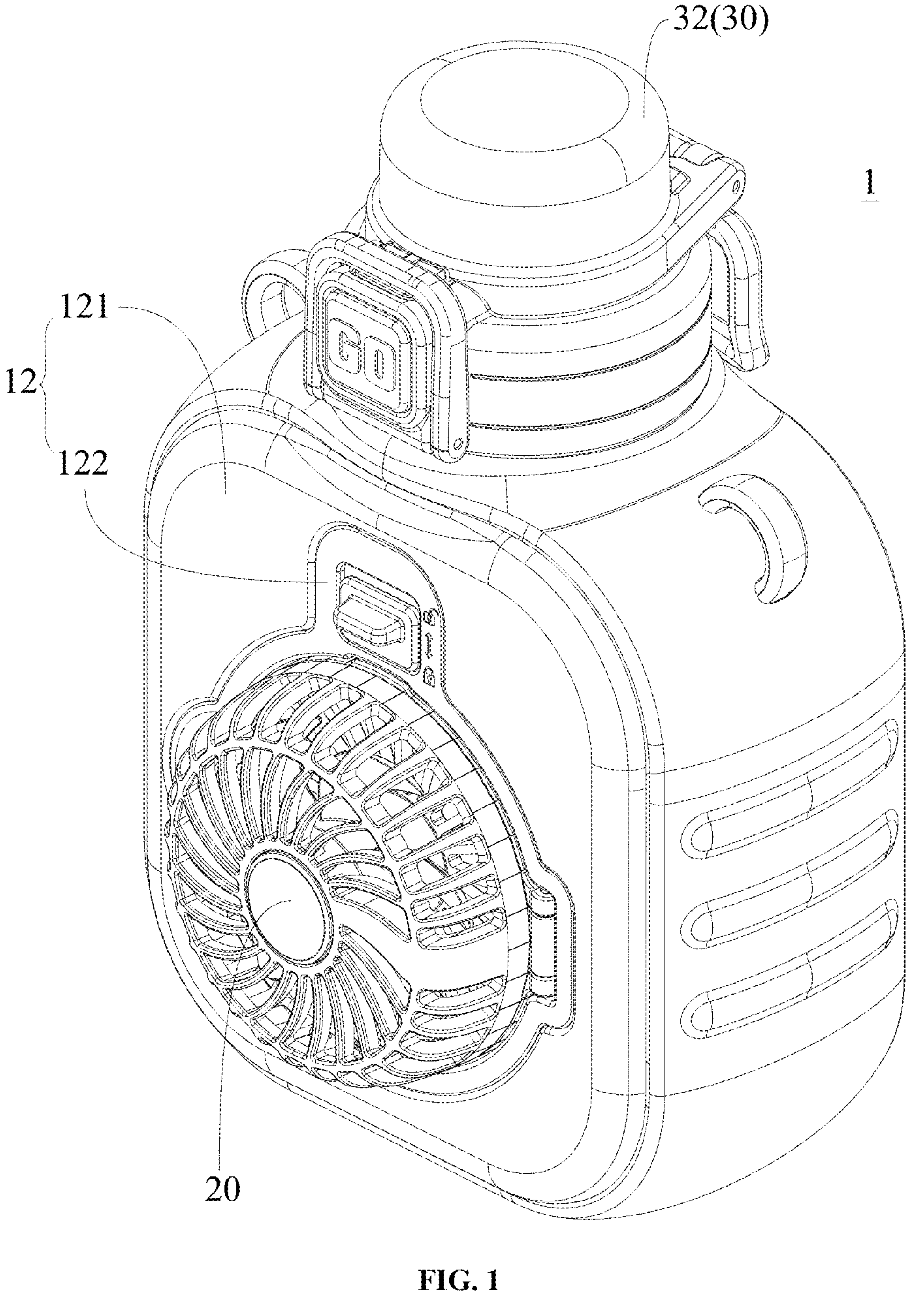
FIG. 1 is a first three-dimensional diagram of a water cup with a fan in Embodiment I of the present disclosure.
Figure 2:
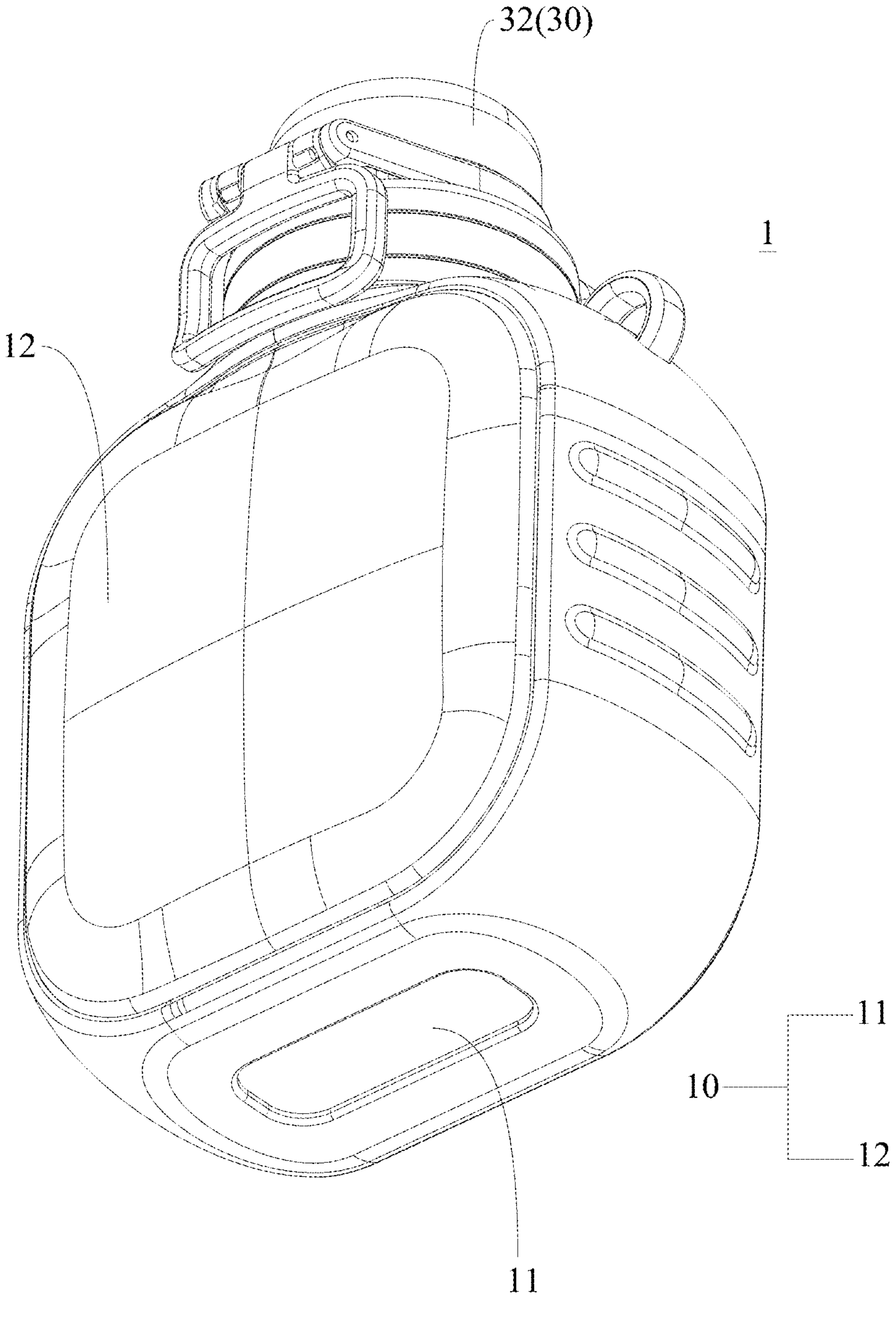
FIG. 2 is a three-dimensional diagram of the water cup with the fan in FIG. 1 in another viewing angle.
Figure 3:
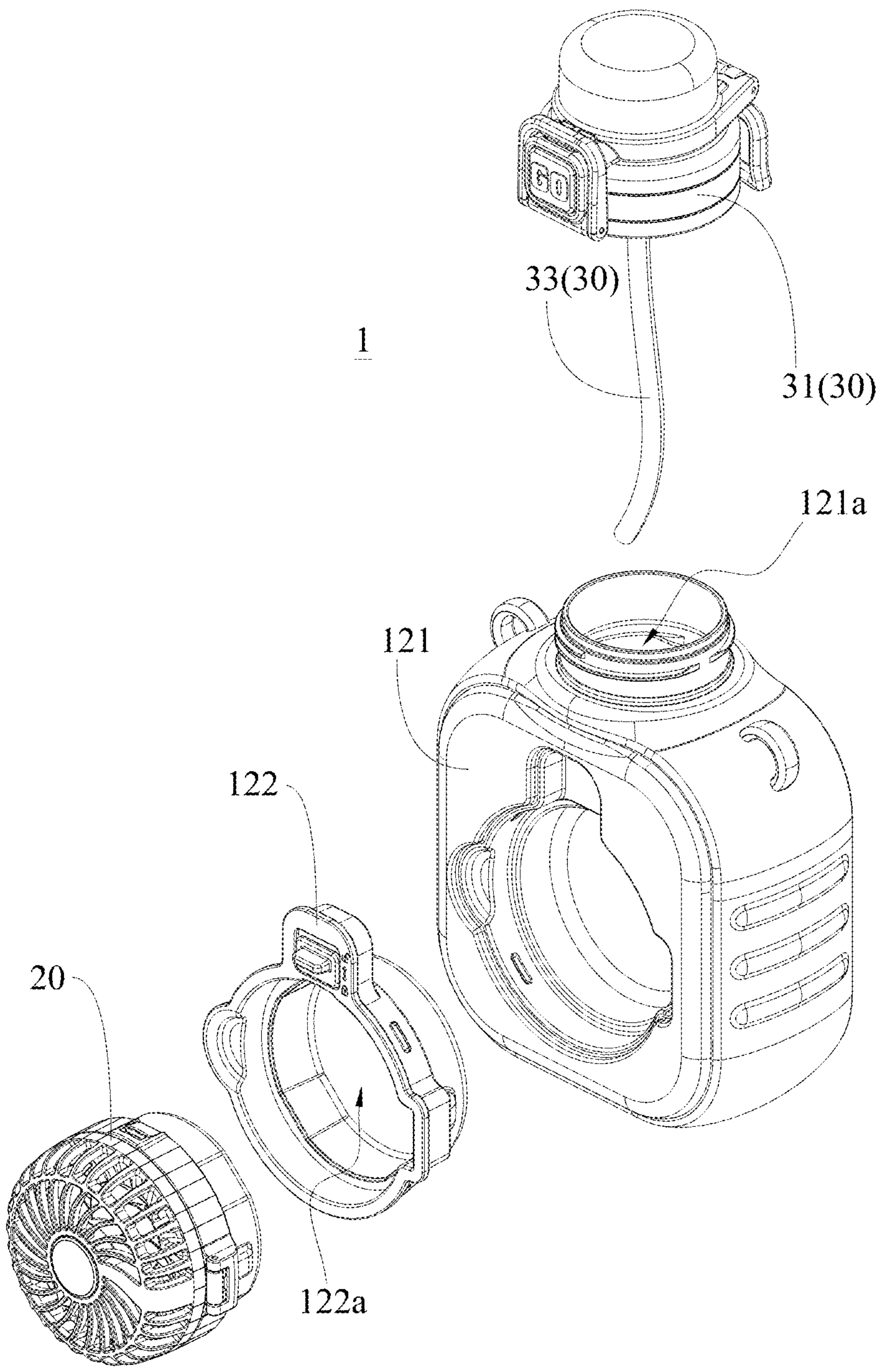
FIG. 3 is a partially exploded diagram of the water cup with the fan in FIG. 1.
Figure 4:
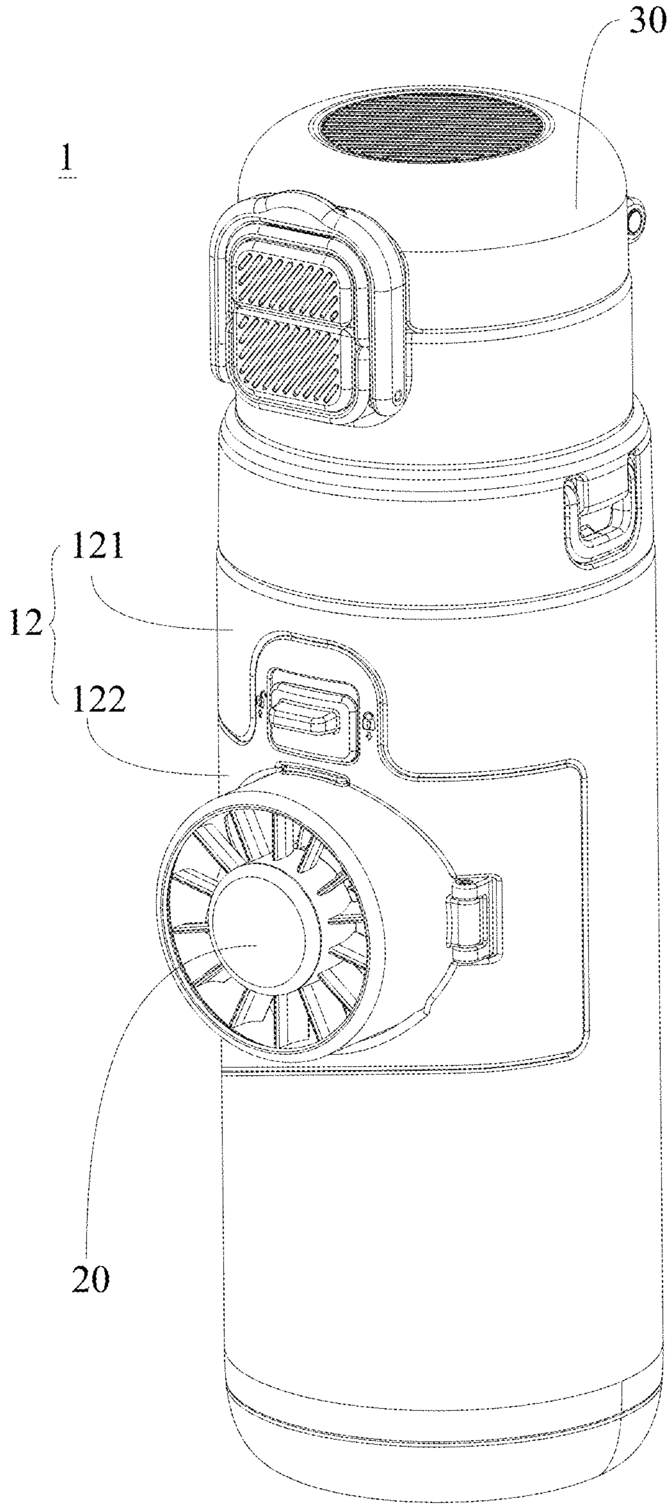
FIG. 4 is a second three-dimensional diagram of a water cup with a fan in Embodiment I of the present disclosure.
Figure 5:
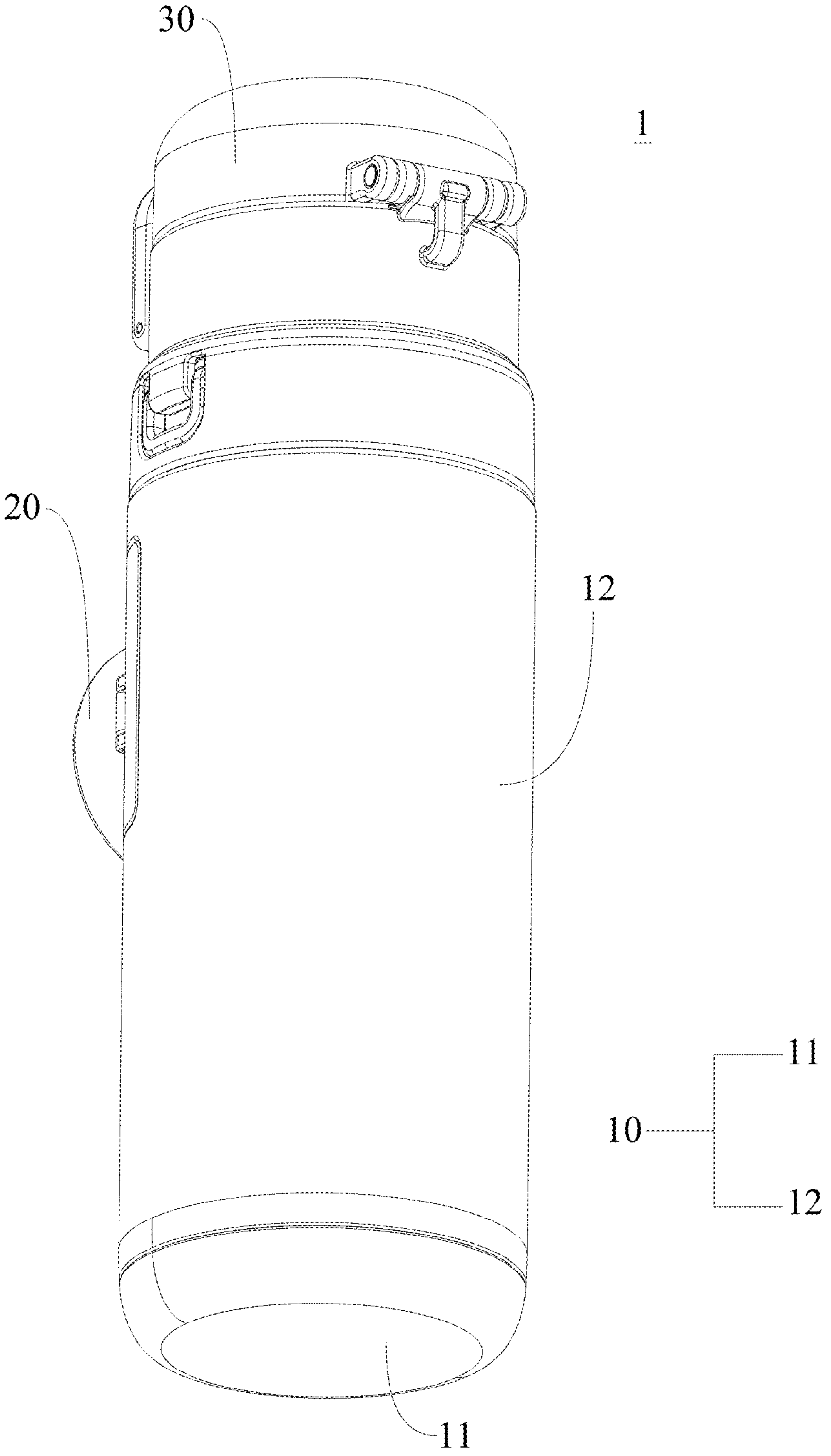
FIG. 5 is a three-dimensional diagram of the water cup with the fan in FIG. 4 in another viewing angle.

Referring to FIG. 1 to FIG. 3, Embodiment I of the present disclosure provides a water cup 1 with a fan. The water cup 1 with the fan includes a cup body 10 and a fan assembly 20. The cup body 10 includes a bottom plate 11 and a side wall structure 12 connected to the bottom plate 11. The bottom plate 11 and the side wall structure 12 are enclosed to an accommodating cavity 121*a* with an opening. The fan assembly 20 can be detachably arranged on an outer surface 211*a* of the side wall structure 12.

The cup body 10 is configured to store liquid. There is no limitation on a specific material of the cup body 10. The designer can make a proper choice according to an actual need. For example, a material of the cup body 10 can be, but is not limited to, plastic, resin, silica gel, food-grade stainless steel, or the like. When the material of the cup body 10 is plastic or silica gel, the bottom plate 11 and the side wall structure 12 can be formed into an integrated structure through, but not limited to, injection molding or blow molding. The injection molding is a process of heating thermoplastic to a molten state, injecting it into a closed mold under a pressure, cooling and solidifying the molten plastic, and then carrying out demolding. The blow molding is a process of making thermoplastic resin into a tubular billet, and swelling the billet through compressed air to be adhere to an inner wall of a mold, to form a hollow structure. It should be noted that based on different selected materials, when the material of the cup body 10 is the food-grade stainless steel, the water cup 1 with the fan further has a heat insulation function.

The fan assembly 20 is configured to drive air to flow, to form an air flow. No limitation is made on a specific detachable connection manner for the fan assembly 20 and the side wall structure 12. The designer can make a proper design according to an actual need. For example, the fan assembly 20 can be detachably connected to the side wall structure 12 through at least one of manners such as threaded connection, snap-in connection, plugging connection, negative pressure adsorption connection, and magnetic attraction connection.

Based on the water cup 1 with the fan in this embodiment, by designing the bottom plate 11 and the side wall structure 12, the bottom plate 11 and the side wall structure 12 are enclosed into the accommodating cavity 121*a* with the opening, and water can be injected into the cup body 10 from the opening of the accommodating cavity 121*a*. By designing the fan assembly 20, a user can use the fan assembly 20 for cooling. The fan assembly 20 is designed to be detachably connected to the side wall structure 12, so that the user can remove the fan assembly 20 from the side wall structure 12 according to an actual need, making the fan assembly 20 be as close to human skin as possible to enhance a cooling effect. In addition, when the fan assembly 20 or the cup body 10 is damaged separately, the fan assembly 20 or the cup body 10 can be replaced separately, without replacing the entire water cup 1 with the fan. This can reduce a waste of resources. The water cup 1 with the fan not only has a water storage function through the cup body 10, but also has a cooling function based on the design of the fan assembly 20. The water cup has diverse functions.

In this embodiment, as shown in FIG. 1 to FIG. 5, the side wall structure 12 includes a side wall body 121 and a fan mounting member 122 connected to an outer side of the side wall body 121. The fan mounting member 122 is connected to the side wall body 121 and the bottom plate 11 into a whole by using a secondary molding process after being separately made; and the side wall body 121 and the bottom plate 11 are enclosed into the accommodating cavity 121*a*. Secondary molding is also referred to as secondary injection molding or two-color injection molding, which is an injection molding process. By injecting a material for making the fan mounting member 122 into a mold, after the fan mounting member 122 is molded by injection, the molded fan mounting member 122 is put into another mold for making the side wall body 121 and the bottom plate 11, and then materials for making the side wall body 121 and the bottom plate 11 are injected into the another mold. The blow molding manner is used to combine the two materials and finally connect the fan mounting member 122 to the side wall body 121 and the bottom plate 11 into a whole. The side wall body 121 and the bottom plate 11 can be connected and enclosed to form a cuboid cup body shown in FIG. 1 to FIG. 3 and the side wall body 121 and the bottom plate 11 can also be connected and enclosed to form a cylindrical cup body shown in FIG. 4 to FIG. 5. The fan mounting member 122 is a structural member of the side wall structure 12 that is configured to mount the fan assembly 20. The fan assembly 20 is detachably connected to the fan mounting member 122, and the fan assembly 20 is connected to the side wall body 121 through the fan mounting member 122. After being separately made, the fan mounting member 122 is connected to the side wall body 121 and the bottom plate 11 into a whole through the secondary molding process. In this way, a difficulty of assembling between the fan mounting member 122 and the side wall body 121 can be lowered, and strength of connection between the fan mounting member 122 and the side wall body 121 can be effectively improved.

It should be noted that the side wall body 121 and the bottom plate 11 are enclosed to form the above accommodating cavity 121*a*, and the side wall body 121 and the bottom plate 11 are processed by using the blow molding manner. In this way, the side wall body 121 and the bottom plate 11 can be directly enclosed into the accommodating cavity 121*a* in any shape by injecting air, which is convenient for a later demolding operation. In addition, the fan mounting member 122 is obtained by using the injection molding manner. The molded fan mounting member 122, the side wall body 121, and the bottom plate 11 are formed into an integrated structure by using the blow molding manner, to implement reliable connection and reduce costs.

Figure 6:
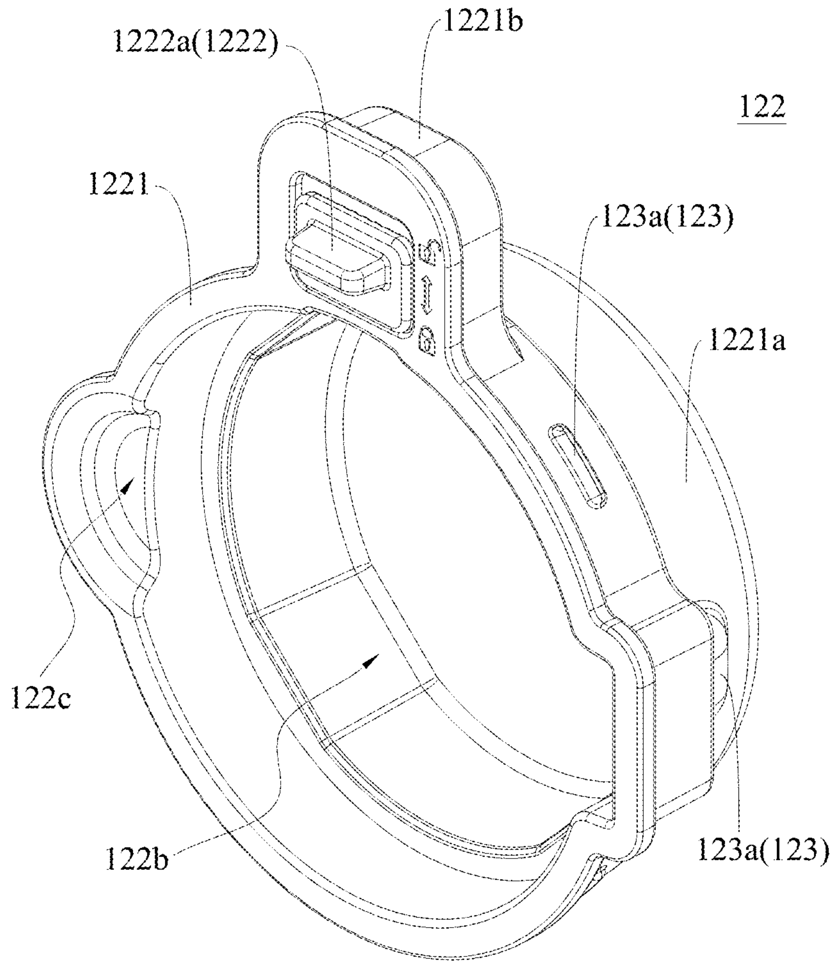
FIG. 6 is a first three-dimensional diagram of a fan mounting member in Embodiment I of the present disclosure.
Figure 7:
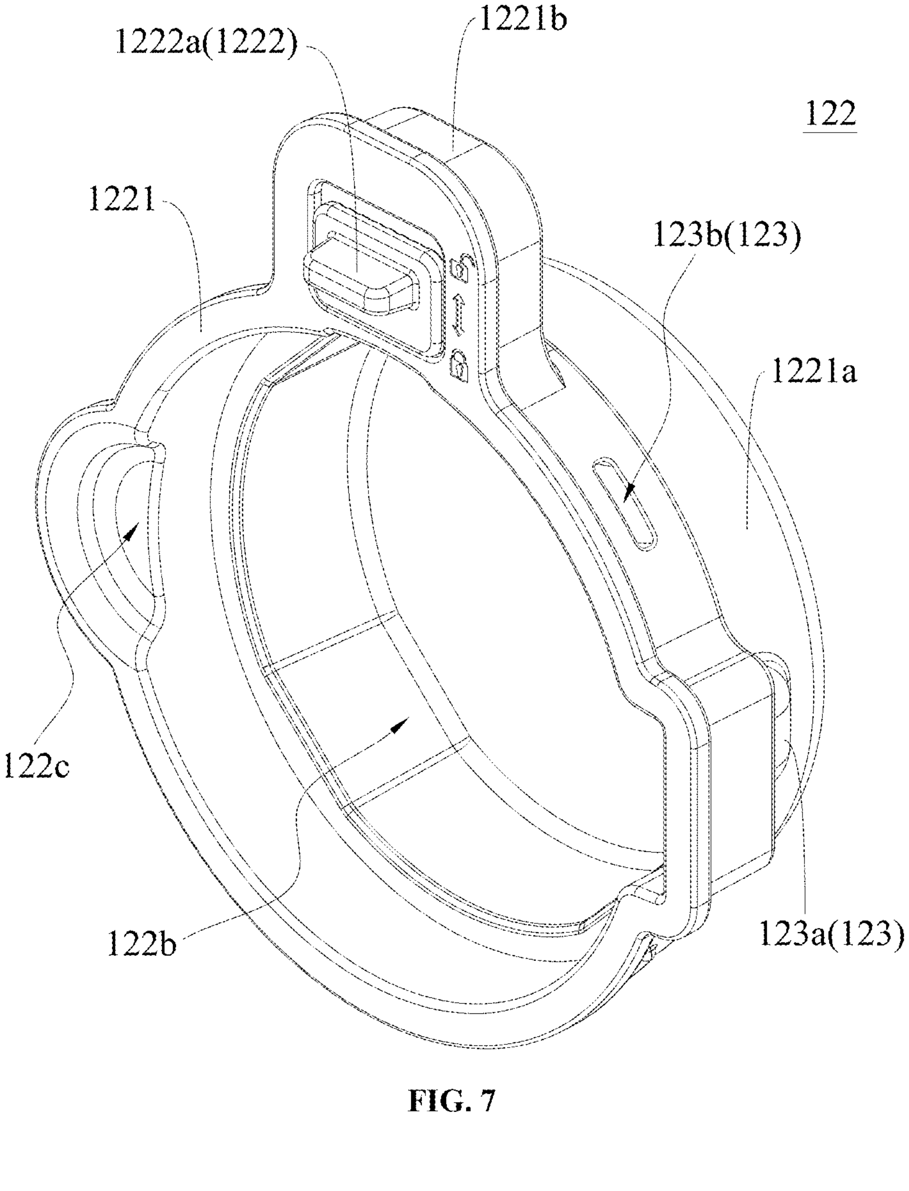
FIG. 7 is a second three-dimensional diagram of a fan mounting member in Embodiment I of the present disclosure.

In this embodiment, as shown in FIG. 6 and FIG. 7, at least one connection part 123 is arranged on a surface 211*a* of the fan mounting member 122 that is connected to the side wall body 121. The at least one connection part 123 includes at least one of a protrusion 123*a* and a groove 123*b*. The at least one connection part 123 is configured to enlarge an area of connection with the side wall body 121. There may be one or more (more than two) connection parts 123. For example, when the connection part 123 only includes a solid structure such as the protrusion 123*a* arranged on the surface 211*a* of the fan mounting member 122 that is connected to the side wall body 121. In this way, a void structure such as another groove adapted to the protrusion 123*a* is designed on a surface 211*a* of the side wall body 121 that is connected to the fan mounting member 122. The protrusion 123*a* cooperates with the another groove to enlarge the area of connection between the fan mounting member 122 and the side wall body 121 and improve stability of connection between the fan mounting member 122 and the side wall body 121. For another example, when the connection part 123 only includes a void structure such as the groove 123*b* formed in the surface 211*a* of the fan mounting member 122 that is connected to the side wall body 121. In this way, a solid structure such as another protrusion adapted to the groove 123*b* is designed on a surface 211*a* of the side wall body 121 that is connected to the fan mounting member 122. The groove 123*b* cooperates with the another protrusion to enlarge the area of connection between the fan mounting member 122 and the side wall body 121 and improve stability of connection between the fan mounting member 122 and the side wall body 121. For still another example, when the connection part 123 includes a solid structure such as the protrusion 123*a* arranged on the surface 211*a* of the fan mounting member 122 that is connected to the side wall body 121 and a void structure such as the groove 123*b* formed in the surface 211*a* of the fan mounting member 122 that is connected to the side wall body 121. In this way, a void structure such as another groove adapted to the protrusion 123*a* is designed on a surface 211*a* of the side wall body 121 that is connected to the fan mounting member 122 and a solid structure such as another protrusion adapted to the groove 123*b* is designed on a surface 211*a* of the side wall body 121 that is connected to the fan mounting member 122. The protrusion 123*a* cooperates with the another groove and the groove 123*b* cooperates with the another protrusion, to enlarge the area of connection between the fan mounting member 122 and the side wall body 121 and improve stability of connection between the fan mounting member 122 and the side wall body 121. The connection part 123 can be, but is not limited to, integrally formed with the fan mounting member 122 in the injection molding manner. By designing the connection part 123 on the surface 211*a* of the fan mounting member 122 that is connected to the side wall body 121 and designing the connection part 123 to include at least one of the protrusion 123*a* and the groove 123*b*, the area of connection between the fan mounting member 122 and the side wall body 121 is enlarged, which can improve the stability of connection between the fan mounting member 122 and the side wall body 121.

Specifically, at least one connection part 123 includes a plurality of protrusions 123*a* spaced apart. There may be two, three, four, five, six, or more protrusions 123*a*. The plurality of protrusions 123*a* can be arranged on the surface 211*a* of the fan mounting member 122 that is connected to the side wall body 121 in an equal spacing manner, and the plurality of protrusions 123*a* can also be arranged on the surface 211*a* of the fan mounting member 122 that is connected to the side wall body 121 in an unequal spacing manner. It can be understood that in this case, a plurality of another grooves spaced apart are formed in the surface 211*a* of the side wall body 121 that is connected to the fan mounting member 122. Each protrusion 123*a* is configured to cooperate with another groove. In this way, multi-point connection between the fan mounting member 122 and the side wall body 121 can be implemented by one-to-one corresponding fit between the plurality of protrusions 123*a* and the plurality of another grooves. This can further improve the stability of connection between the fan mounting member 122 and the side wall body 121.

As shown in FIG. 1 and FIG. 3, the fan mounting member 122 has a storage slot 122*a*, and the fan assembly 20 is at least partially arranged in the storage slot 122*a*. For example, the entire fan assembly 20 can be stored in the storage slot 122*a* of the fan mounting member 122, or a portion of the fan assembly 20 can be stored in the storage slot 122*a* of the fan mounting member 122, while a remaining portion of the fan assembly 20 extends out of the storage slot 122*a* of the fan mounting member 122. By designing the storage slot 122*a* in the fan mounting member 122, the fan assembly 20 and the fan mounting member 122 form an inside-outside nested structure, to make a proper use of an inner region of the fan mounting member 122, so that the structural arrangement of the fan assembly 20 and the fan mounting member 122 is more compact, which is beneficial for reducing an overall volume of the water cup 1 with the fan. Specifically, in this embodiment, the fan assembly 20 partially protrudes out of the storage slot 122*a* of the fan mounting member 122.

As shown in FIG. 1, FIG. 6, and FIG. 8 to FIG. 12, the fan mounting member 122 includes a mounting body 1221 and a locking assembly 1222 movably connected to the mounting body 1221. The locking assembly 1222 is configured to move relative to the mounting body 1221 to switch between a locked state and an unlocked state. In the locked state, the locking assembly 1222 resists against the fan assembly 20 to fix the fan assembly 20 to the mounting body 1221. In this case, the fan assembly 20 is limited by the locking assembly 1222 and positioned on the mounting body 1221. This can implement relative fixation in positions of the fan assembly 20 and the mounting body 1221. In the unlocked state, the locking assembly 1222 releases the fan assembly 20, so that the fan assembly 20 can be removed from the mounting body 1221. In this case, the fan assembly 20 is released from the mounting body 1221 without the limitation of the locking assembly 1222, which can change a relative position between the fan assembly 20 and the mounting body 1221, thereby removing the fan assembly 20 from the mounting body 1221.

Specifically, the locking assembly 1222 includes a lock catch 1222*a* and a resetting driving member 1222*b*. The lock catch 1222*a* is configured to switch between a locking position for resisting against the fan assembly 20 and an unlocking position for being separated from the fan assembly 20. The resetting driving member 1222*b* is connected between the lock catch 1222*a* and the mounting body 1221. The resetting driving member 1222*b* is configured to drive the lock catch 1222*a* to be reset from the unlocking position to the locking position. It can be understood that the lock catch 1222*a* has the locking position and the unlocking position. When the lock catch 1222*a* is in the locking position, the lock catch 1222*a* resists against the fan assembly 20 to lock the fan assembly 20 to the mounting body 1221, thus keeping the positions of the fan assembly 20 and the mounting body 1221 relatively fixed. In this case, the locking assembly 1222 is in the locked state. When the lock catch 1222*a* is in the unlocking position, the lock catch 1222*a* is separated from the fan assembly 20 to unlock the fan assembly 20 to the mounting body 1221, so that the positions of the fan assembly 20 and the mounting body 1221 can change relatively. In this way, the locking assembly 1222 is in the unlocked state. The lock catch 1222*a* can move from the locking position to the unlocking position under an external force. Meanwhile, in the process that the lock catch 1222*a* moves from the locking position to the unlocking position, the resetting driving member 1222*b* is applicable to generating elastic deformation. When the lock catch 1222*a* is in the unlocking position, after the external force on the lock catch 1222*a* is withdrawn, the lock catch 1222*a* can move from the unlocking position to the locking position under an elastic recovery force generated in a process of elastic deformation recovery of the resetting driving member 1222*b*, thereby implementing automatic resetting of the lock catch 1222*a*.

As shown in FIG. 8 to FIG. 12, the lock catch 1222*a* includes an operating part 1222*a*1 and a latching part 1222*a*2. The mounting body 1221 includes a first part 1221*a* and a second part 1221*b* connected to the first part 1221*a*. The first part 1221*a* has the storage slot 122*a* and a through hole 1221*a*1 communicated to the storage slot 122*a*. The second part 1221*b* includes a first movable slot 1221*bl* located on a first side, a second movable slot 1221*b*2 located on a second side, and a movable hole 1221*b*3 connected between the first movable slot 1221*bl* and the second movable slot 1221*b*2. The operating part 1222*a*1 is movably mounted in the first movable slot 1221*b*1 and is at least partially connected to the latching part 1222*a*2 through the movable hole 1221*b*3. The latching part 1222*a*2 is movably mounted in the second movable slot 1221*b*2 and can extend into the storage slot 122*a* via the through hole 1221*a*1 to resist against the fan assembly 20. The resetting driving member 1222*b* is connected to one end of the latching part 1222*a*2 that is away from the through hole 1221*a*1. One end of the resetting driving member 1222*b* that is away from the latching part 1222*a*2 resists against a slot wall of the second movable slot 1221*b*2. It can be understood that the operating part 1222*a*1 is applicable to moving inside the first movable slot 1221*b*1 under an external force. The movement of the operating part 1222*a*1 drives the latching part 1222*a*2 connected to it to move inside the second movable slot 1221*b*2 in a direction away from the through hole 1221*a*1 until the operating part 1222*a*1 drives the latching part 1222*a*2 to move to cause the lock catch 1222*a* to be in the unlocking position. In this case, the latching part 1222*a*2 is separated from a buckling slot 20*a* of the fan assembly 20, to unlock the fan assembly 20 to the mounting body 1221, so that the positions of the fan assembly 20 and the mounting body 1221 can be relatively changed. In this case, the locking assembly 1222 is in the unlocked state. After the external force on the operating part 1222*a*1 is withdrawn, the resetting driving part 1222*b* is recovered from the elastic deformation. The latching part 1222*a*2 moves inside the second movable slot 1221*b*2 in a direction close to the through hole 1221*a*1 under the elastic recovery force of the resetting driving part 1222*b*. The movement of the latching part 1222*a*2 drives the operating part 1222*a*1 connected to it to move inside the first movable slot 1221*bl* until the latching part 1222*a*2 drives the operating part 1222*a*1 to move to cause the lock catch 1222*a* to be in the locking position. In this case, the latching part 1222*a*2 resists against the buckling slot 20*a* of the fan assembly 20 to lock the fan assembly 20 to the mounting body 1221. The positions of the fan assembly 20 and the mounting body 1221 are kept relatively fixed. In this case, the locking assembly 1222 is in the locked state.

The resetting driving member 1222*b* includes an elastic member 1222*b*1. When the lock catch 1222*a* is in the unlocking position, the elastic member 1222*b*1 is compressed, so that when an operation on the lock catch 1222*a* is stopped in the unlocked state, the elastic member 1222*b*1 releases an elastic force to drive the lock catch 1222*a* to move to the locking position. The elastic member 1222*b*1 can be a spring or a clip. The lock catch 1222*a* is applicable to counteracting the elastic force of the elastic member 1222*b*1 to move from the locking position to the unlocking position under the external force. When the lock catch 1222*a* is in the unlocking position, the elastic member 1222*b*1 undergoes the elastic deformation and is compressed, and the locking assembly 1222 is in the unlocked state. After the external force on the lock catch 1222*a* is withdrawn, the elastic member 1222*b*1 is recovered from the elastic deformation, and the lock catch 1222*a* moves to the locking position under the elastic recovery force generated in the process of elastic deformation recovery of the elastic member 1222*b*1.

As shown in FIG. 8 to FIG. 12, the lock catch 1222*a* also includes an assembling part 1222*a*3. The assembling part 1222*a*3 is arranged at one end of the latching part 1222*a*2 away from the through hole 1221*a*1. One end of the elastic member 1222*b*1 is connected to a slot wall of the second movable slot 1221*b*2, and another end of the elastic member 1222*b*1 is connected to the assembling part 1222*a*3. For example, when the elastic member 1222*b*1 is a spring, one end of the spring is connected to the slot wall of the second movable slot 1221*b*2, and another end of the spring sleeves the assembling part 1222*a*3. By designing the assembling part 1222*a*3, the assembling part 1222*a*3 is configured to be connected to another end of the elastic member 1222*b*1. In this way, the stability of connection between the elastic member 1222*b*1 and the latching part 1222*a*2 can be ensured, so that the elastic member 1222*b*1 can undergo effective elastic deformation under the compression of the latching part 1222*a*2.

As shown in FIG. 1, FIG. 3, FIG. 6, and FIG. 8, the storage slot 122*a* includes a storage main body part 122*b* and an extension part 122*c* communicated to the storage main body part 122*b*. The fan assembly 20 is detachably arranged on the storage main body part 122*b*, and the extension part 122*c* is configured to place fingers of a user to facilitate the user to place and fetch the fan assembly 20. The storage main body part 122*b* is configured to accommodate the fan assembly 20, so that the fan assembly 20 and the fan mounting member 122 form an inside-outside nested structure, so that the structural arrangement of the fan assembly 20 and the fan mounting member 122 is more compact, which is beneficial for reducing an overall volume of the water cup 1 with the fan. By designing the extension part 122*c* communicated to the storage main body part 122*b*, the fingers of the user can be directly placed in the extension part 122*c*. Meanwhile, by directly moving the fan assembly 20 to separate the fan assembly 20 from the fan mounting member 122, the difficulty of placing and fetching the fan assembly 20 by the user is lowered.

Figure 8:
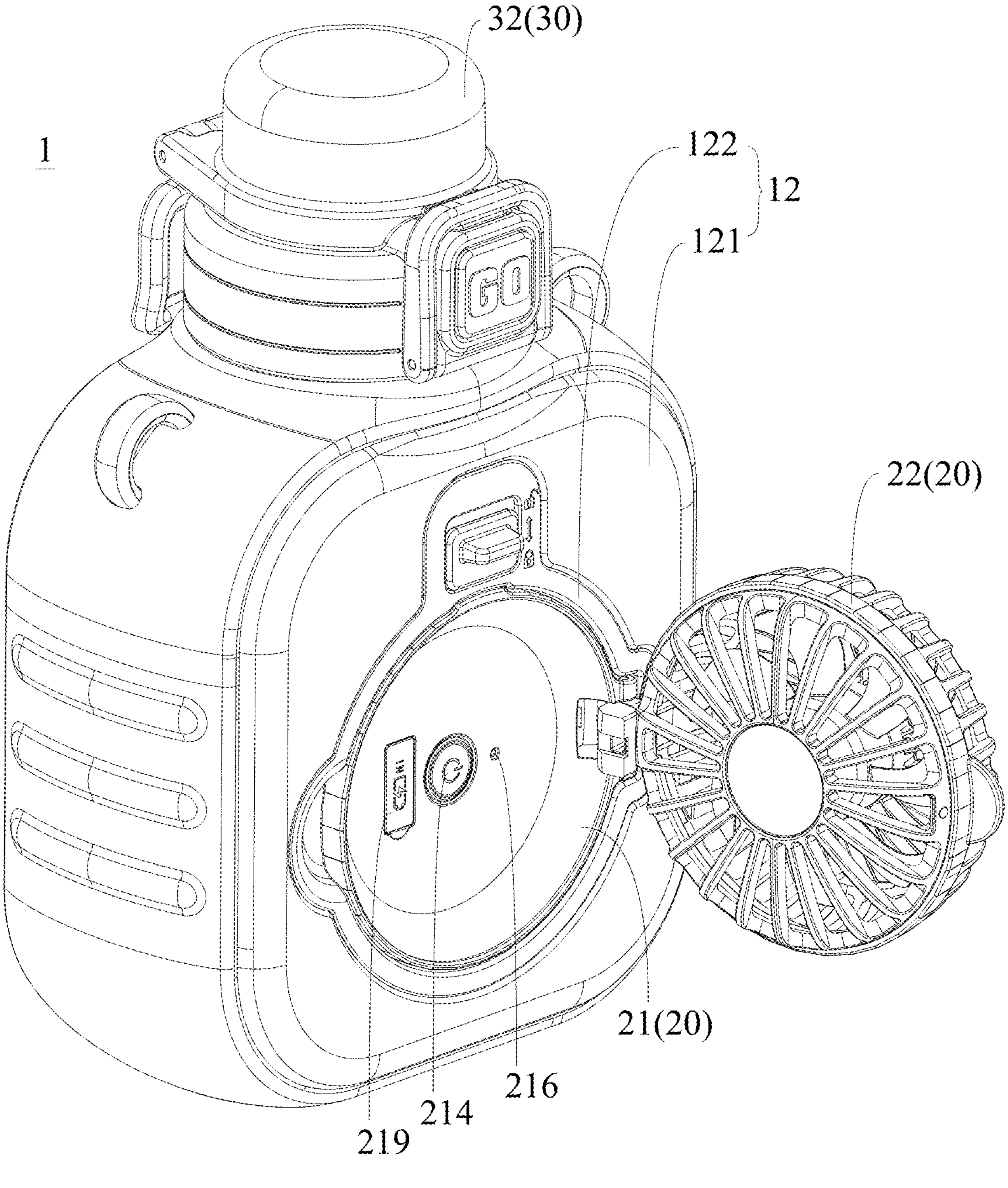
FIG. 8 is a three-dimensional diagram of a fan head in FIG. 1 in an unfolded state.
Figure 9:
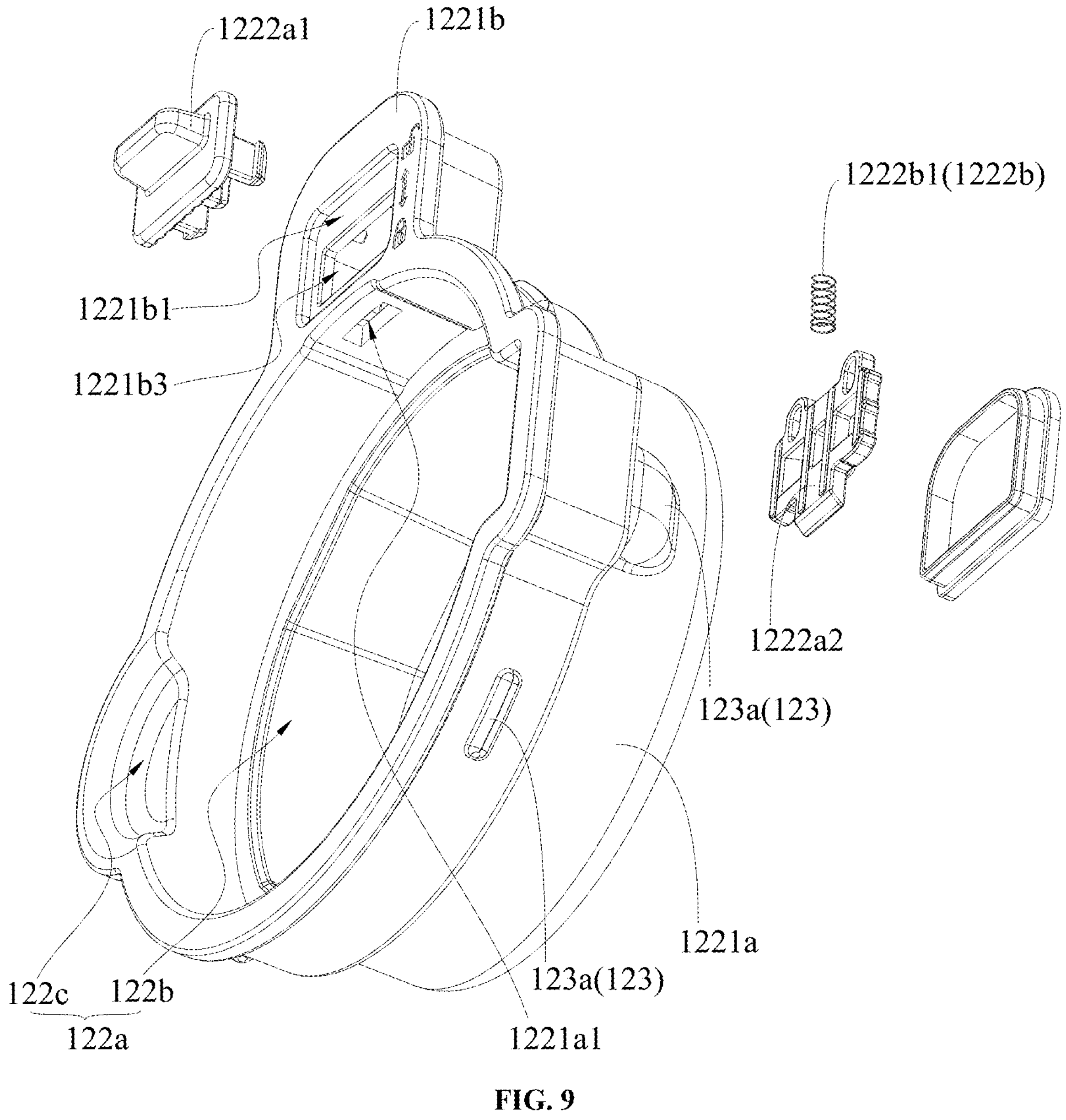
FIG. 9 is an exploded diagram of the fan mounting member in FIG. 6 in a first viewing angle.
Figure 10:
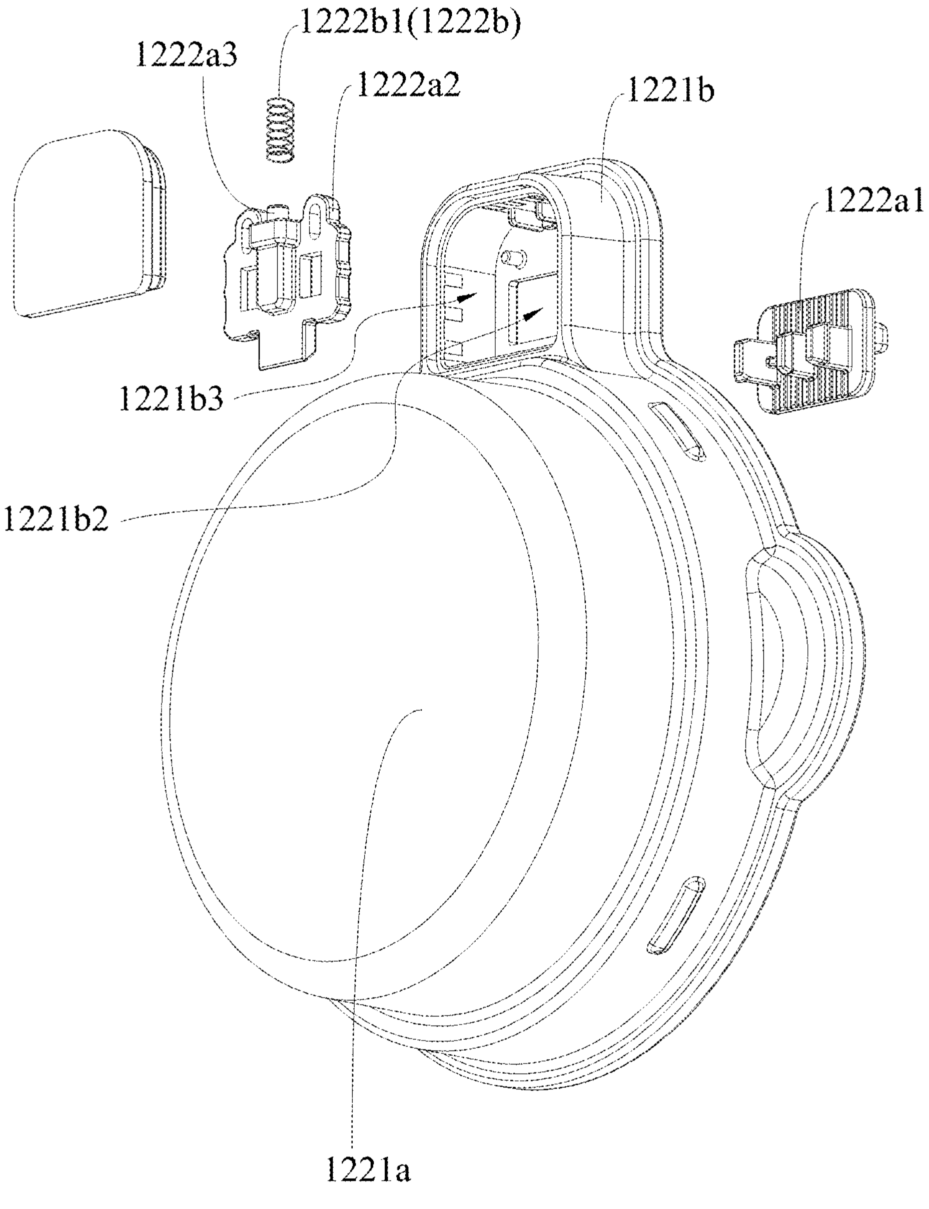
FIG. 10 is an exploded diagram of the fan mounting member in FIG. 6 in a second viewing angle.
Figure 11:
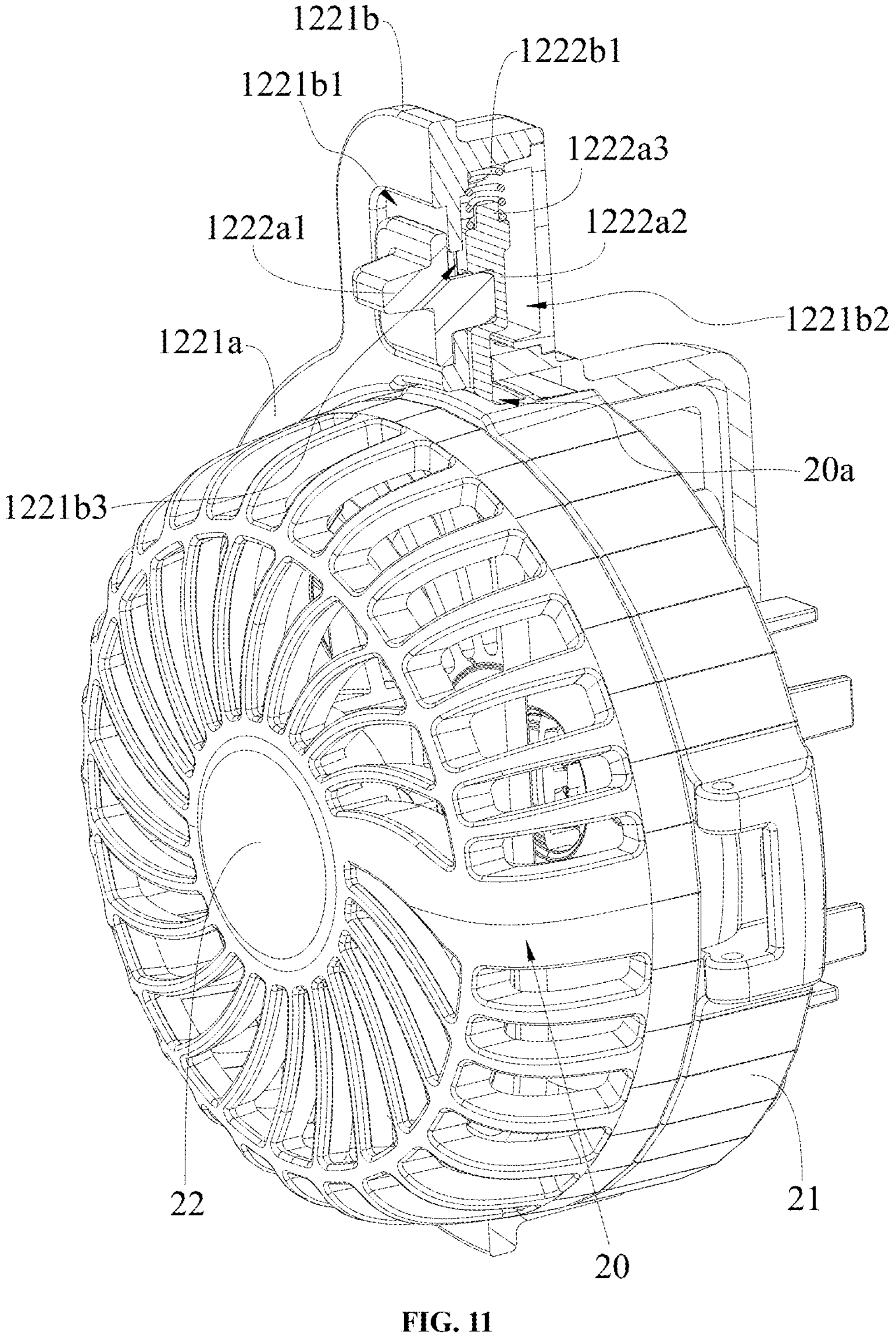
FIG. 11 is a partially cross-sectional view of a locking assembly in a locked state in Embodiment I of the present disclosure.
Figure 12:
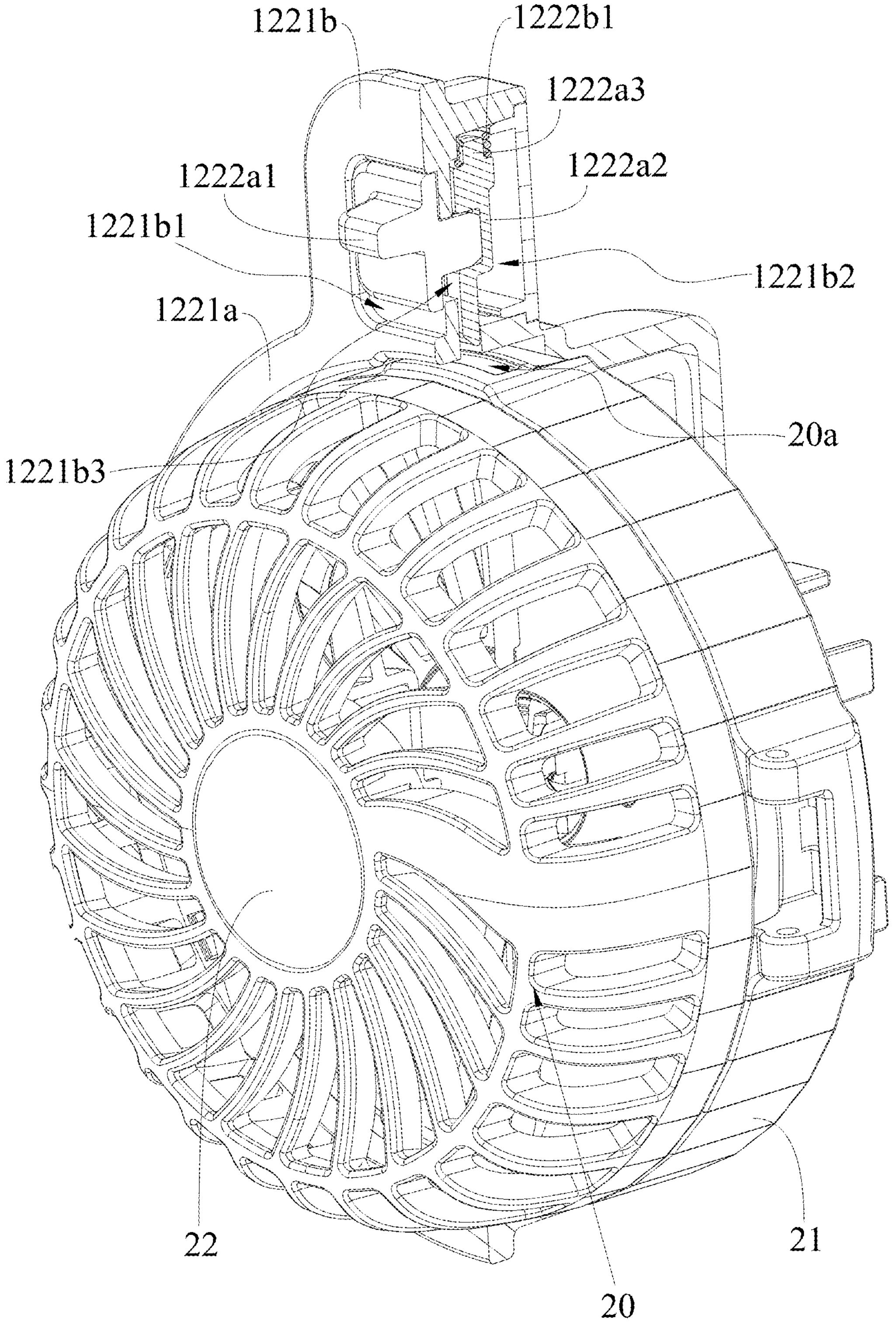
FIG. 12 is a partially cross-sectional view of a locking assembly in an unlocked state in Embodiment I of the present disclosure.

As shown in FIG. 1 and FIG. 8, the fan assembly 20 includes a base 21 and a fan head 22 movably connected to the base 21. The base 21 is detachably connected to the cup body 10 (which is specifically the fan mounting member 122 described above). The fan head 22 is movably connected to the base 21. The fan head 22 can switch between an unfolded state of being unfolded relative to the base 21 and a folded state of being folded relative to the base 21. The fan head 22 can be rotatably connected to the base 21, and the fan head 22 can also be slidably connected to the base 21. By designing the base 21 and the fan head 22, the fan head 22 is connected to the cup body 10 through the base 21, and the fan head 22 is movably connected to the base 21 to enable the fan head 22 to have an unfolded state and a folded state. When cooling is required, a user can adjust the fan head 22 to the unfolded state of being unfolded relative to the base 21, so that the fan head 22 fully extends out of the side wall structure 12 (specifically the storage slot 122*a* of the fan mounting member 122), thus avoiding the side wall structure 12 (specifically the storage slot 122*a* of the fan mounting member 122) from blocking the fan head 22. When cooling is not required, the user can adjust the fan head 22 to the folded state of being folded relative to the base 21, so that the fan can be stored in the side wall structure 12 (specifically the storage slot 122A of the fan mounting component 122) as much as possible, to reduce an overall space occupancy of the water cup 1 with the fan when the fan head 22 is idle.

For example, rotatable connection between the fan head 22 and the base 21 is used as an example. When cooling is required, a user rotates the fan head 22, so that the fan head 22 is rotated relative to the base 21 to fully extend out of the side wall structure 12 (specifically the storage slot 122*a* of the fan mounting component 122) and be in the unfolded state. When cooling is not required, the user rotates the fan head 22, so that the fan head 22 is rotated relative to the base 21 to be stored as much as possible in the side wall structure 12 (specifically the storage slot 122*a* of the fan mounting component 122) and be in the folded state.

The base 21 is a roughly cylindrical supporting base 217. By designing the base 21 into a columnar base 21 with a roughly circular outer contour, it is convenient for processing. It should be noted that the buckling slot 20*a* is provided in a position, corresponding to the latching part 1222*a*2, on an outer surface 211*a* of the base 21.

Figure 13:
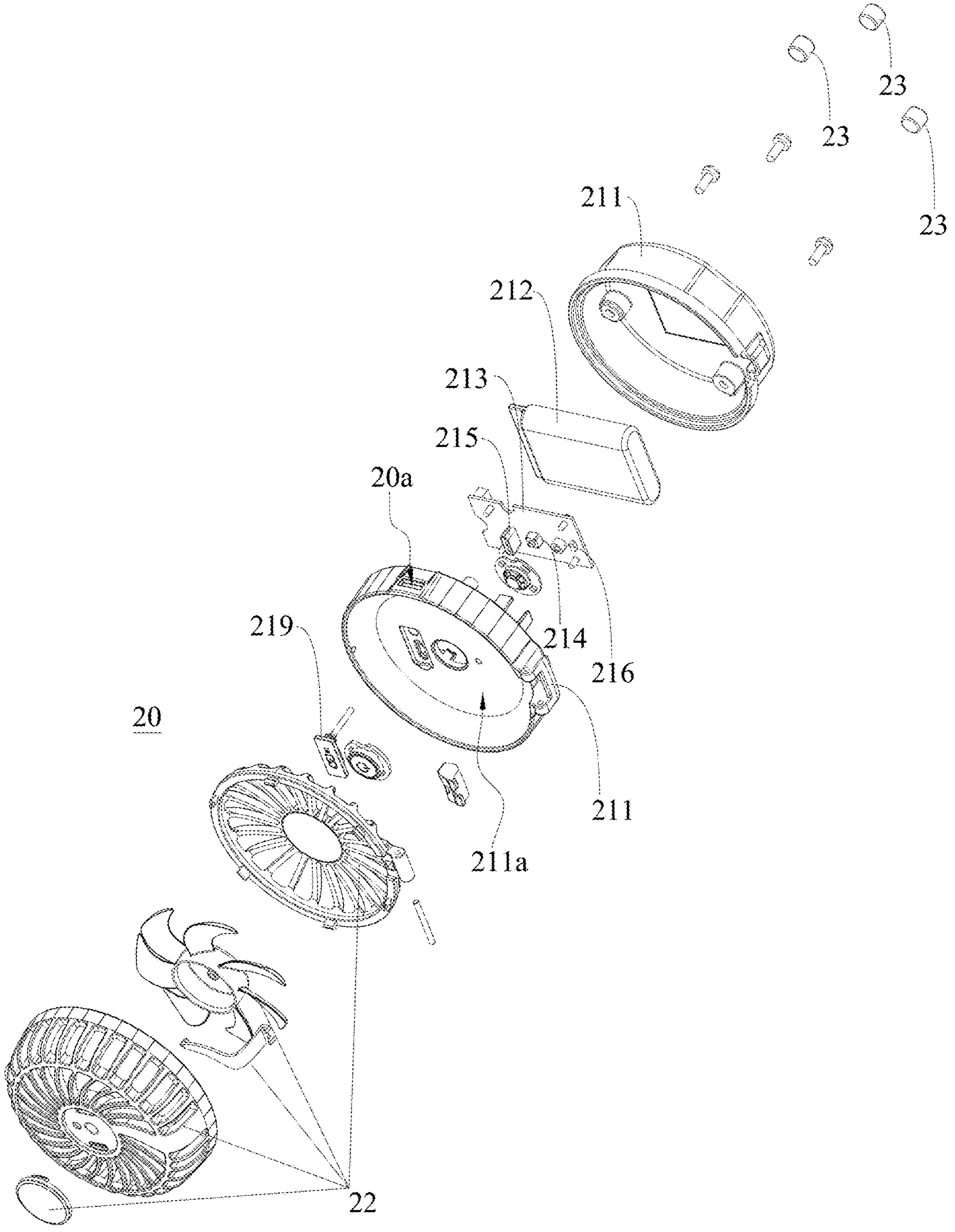
FIG. 13 is an exploded diagram of a fan assembly in Embodiment I of the present disclosure.
Figure 14:
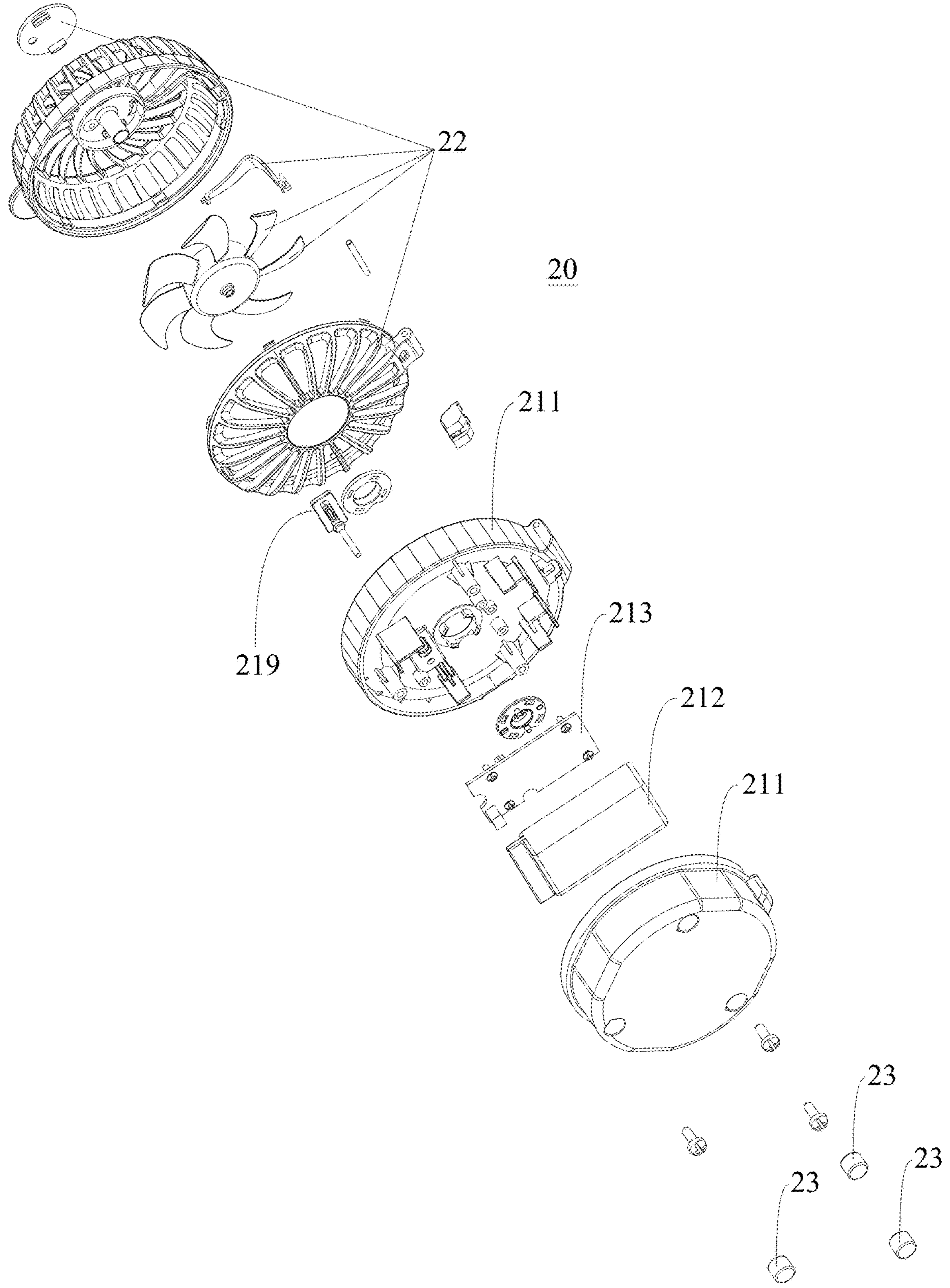
FIG. 14 is an exploded diagram of the fan assembly in FIG. 13 in another viewing angle.

As shown in FIG. 13 and FIG. 14, at least one elastic pad 23 is arranged on one side of the base 21 that is close to the side wall structure 12. A material of the elastic pad 23 can be, but is not limited to, elastic rubber, elastic silica gel, or the like. No limitation is imposed on a specific connection manner for the elastic pad 23 and the base 21. The designer can make a proper design according to an actual need. For example, the elastic pad 23 can be, but is not limited to, detachably connected to the base 21 in at least one of the following manners: screwing, clamping, plugging, or the like. For another example, the elastic pad 23 can also be, but is not limited to, non-detachably connected to the base 21 in a riveting or gluing manner. By designing the elastic pad 23, the elastic pad 23 has a buffering effect and can effectively reduce or even avoid mutual wear between the fan assembly 20 and the side wall structure 12 (specifically the fan mounting component 122) during mounting and removal, thereby prolonging the service lives of the fan assembly 20 and the side wall structure 12.

The base 21 includes a housing 211, a battery 212, a circuit board 213, and a control button 214. The battery 212 and the circuit board 213 are arranged in the housing 211. The housing 211 has a surface 211*a* capable of being folded with the fan head 22. The control button 214 is mounted on the surface 211*a* and is electrically connected to the circuit board 213. The fan head 22 is movably connected to the housing 211. The battery 212 (or the circuit board 213) can be, but is not limited to, detachably connected to the housing 211 in at least one of the following manners: screwing, clamping, plugging, or the like. The battery 212 (or the circuit board 213) can also be, but is not limited to, non-detachably connected to the housing 211 in a riveting or gluing manner. The control button 214 can be configured to control turning on or turning off of the fan head 22. The control button 214 can also be configured to adjust a wind speed gear of the fan head 22. For example, when the fan head 22 is currently in an off state, a user can press the control button 214 once to turn on the fan head 22. Meanwhile, in this case, the fan head 22 is in a first gear with a low wind speed. Based on this, the user can press the control button 214 again to put the fan head 22 in a second gear with a medium wind speed. Based on this, the user can press the control button 214 again to put the fan head 22 in a third gear with a high wind speed. Based on this, the user can press the control button 214 again to cause the fan head 22 to be in the off state. By designing the control button 214 on the surface 211*a* of the housing 211*a* that is folded with the fan head 22, the fan head 22 effectively blocks the control button 214 to prevent the user from accidentally touching the control button 214 when the fan head 22 is idle.

The base 21 further includes a charging port member 215 electrically connected to the circuit board 213, and the charging port member 215 is exposed through an opening on the surface 211*a*. The charging port member 215 can be, but is not limited to, a USB interface or a type-C interface. By designing the charging port member 215, the charging port member 215 is connected to an external power source through a charging cable, the external power source can charge the battery 212. The base 21 further includes a rubber plug 219. The rubber plug 219 is connected to the housing 211 to block or expose the opening corresponding to the charging port member 215. When the charging port member 215 does not need to be connected to the external power source through the charging cable, the rubber plug 219 blocks the opening corresponding to the charging port member 215 to achieve sealing, waterproof, dustproof, and protection effects on the charging port member 215. When the charging port member 215 needs to be connected to the external power source through the charging cable, the rubber plug 219 can be separated from the opening corresponding to the charging port member 215, to expose the charging port member 215.

The base 21 further includes a lighting device 216. The lighting device 216 is electrically connected to the circuit board 213. The lighting device 216 is at least partially exposed through an opening on the surface 211*a*. The lighting device 216 includes a light-emitting diode (LED) lamp. By designing the lighting device 216, the lighting device 216 can display different colors to prompt a user of a current battery level of the battery 212. For example, when the lighting device 216 displays red light, it indicates that the current battery level of the battery 212 is low (for example, it is less than 5%). When the lighting device 216 displays green light, it indicates that the current battery level of the battery 212 is 100%.

Figure 15:
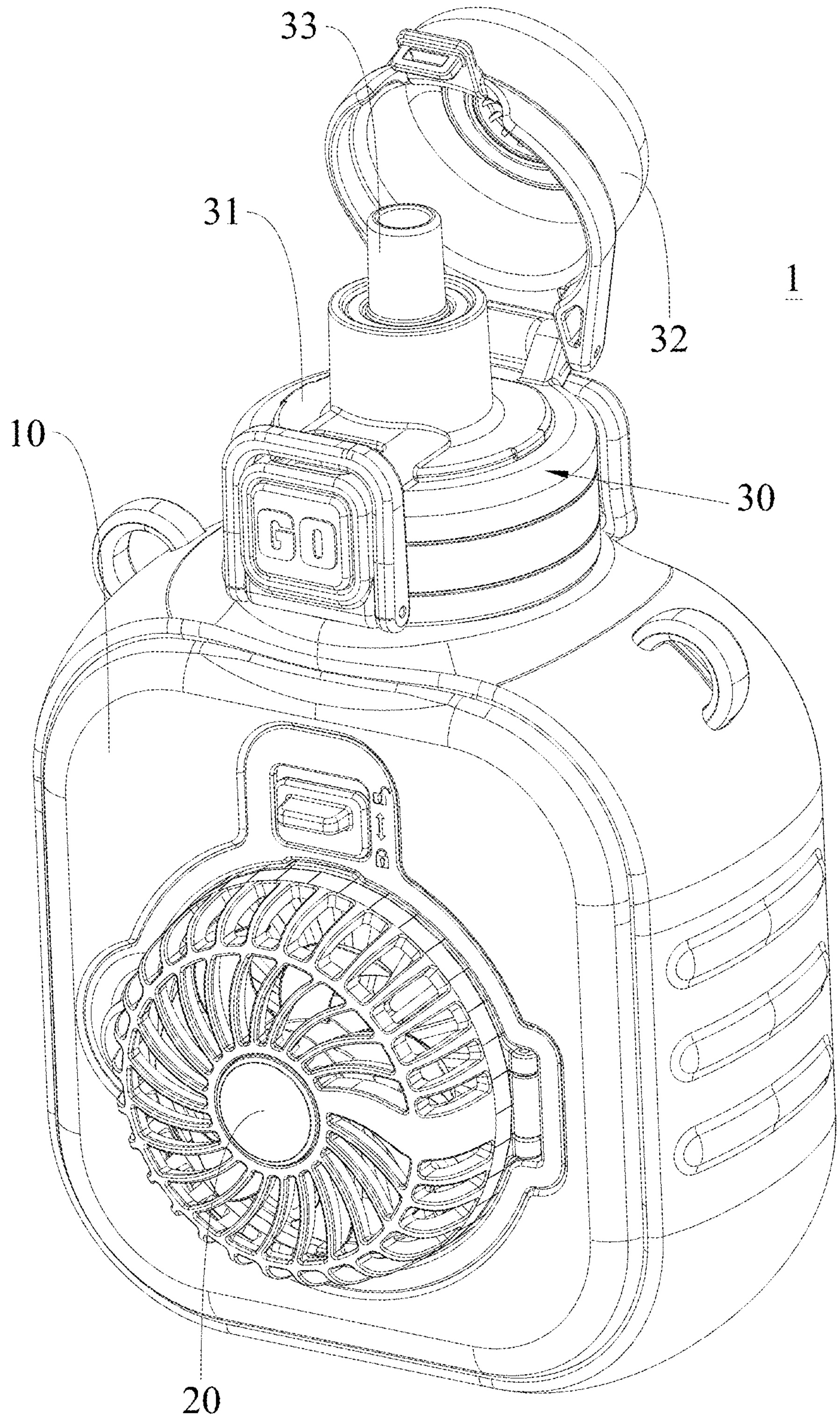
FIG. 15 is a third three-dimensional diagram of a water cup with a fan in Embodiment I of the present disclosure.
Figure 16:
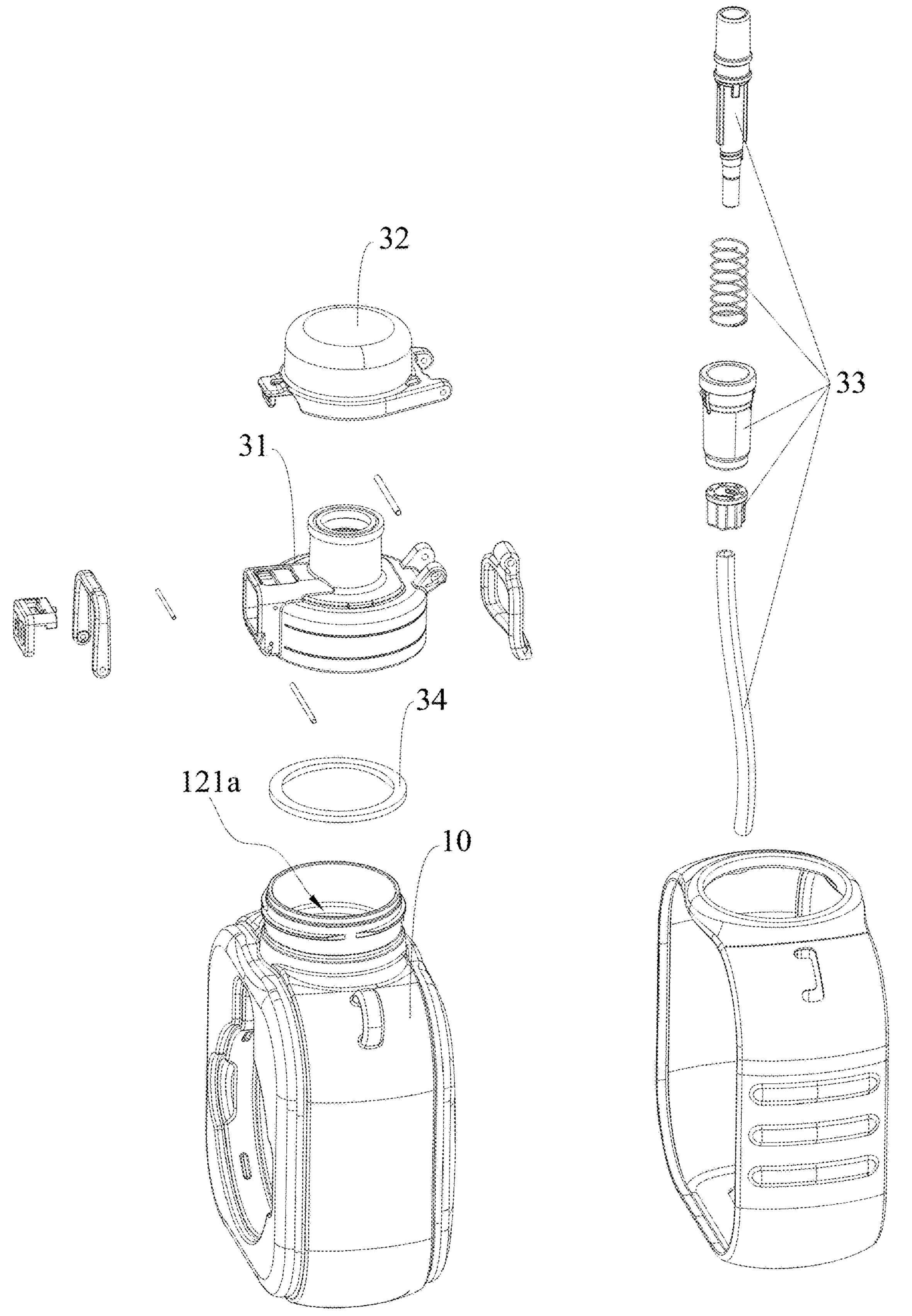
FIG. 16 is a partially exploded diagram of a water cup with a fan in Embodiment I of the present disclosure.
Figure 17:
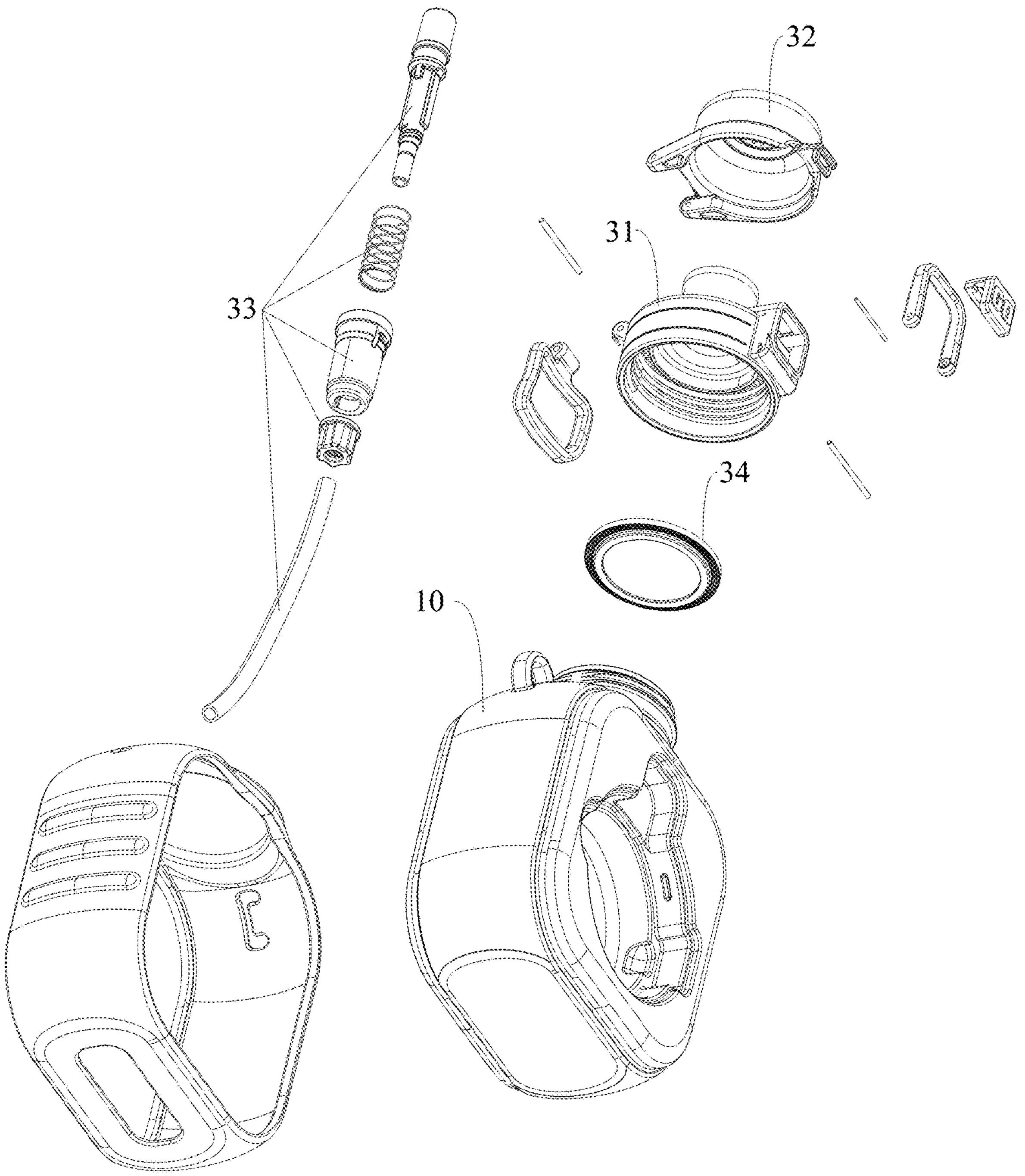
FIG. 17 is a partially exploded diagram of the water cup with the fan in FIG. 16 in another viewing angle.
Figure 18:
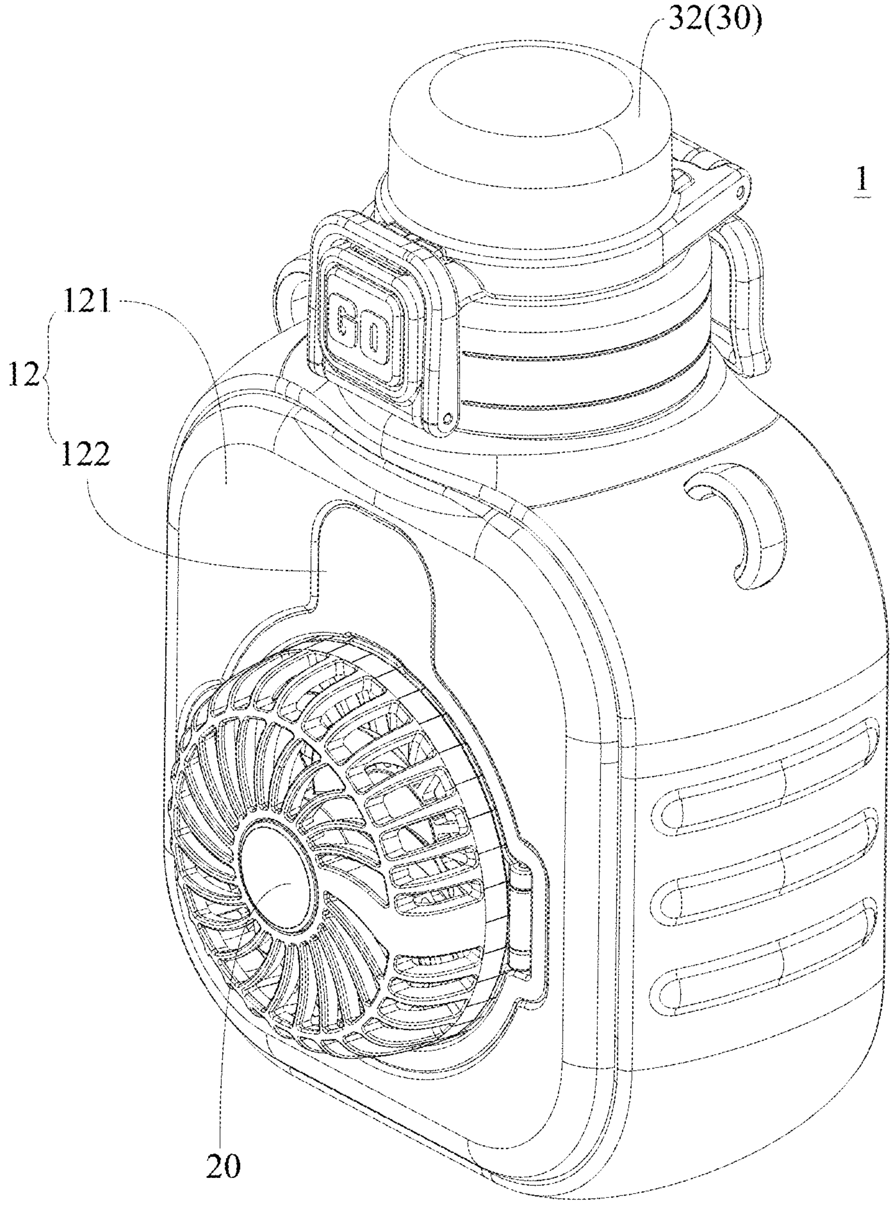
FIG. 18 is a three-dimensional diagram of a water cup with a fan in Embodiment II of the present disclosure.
Figure 19:
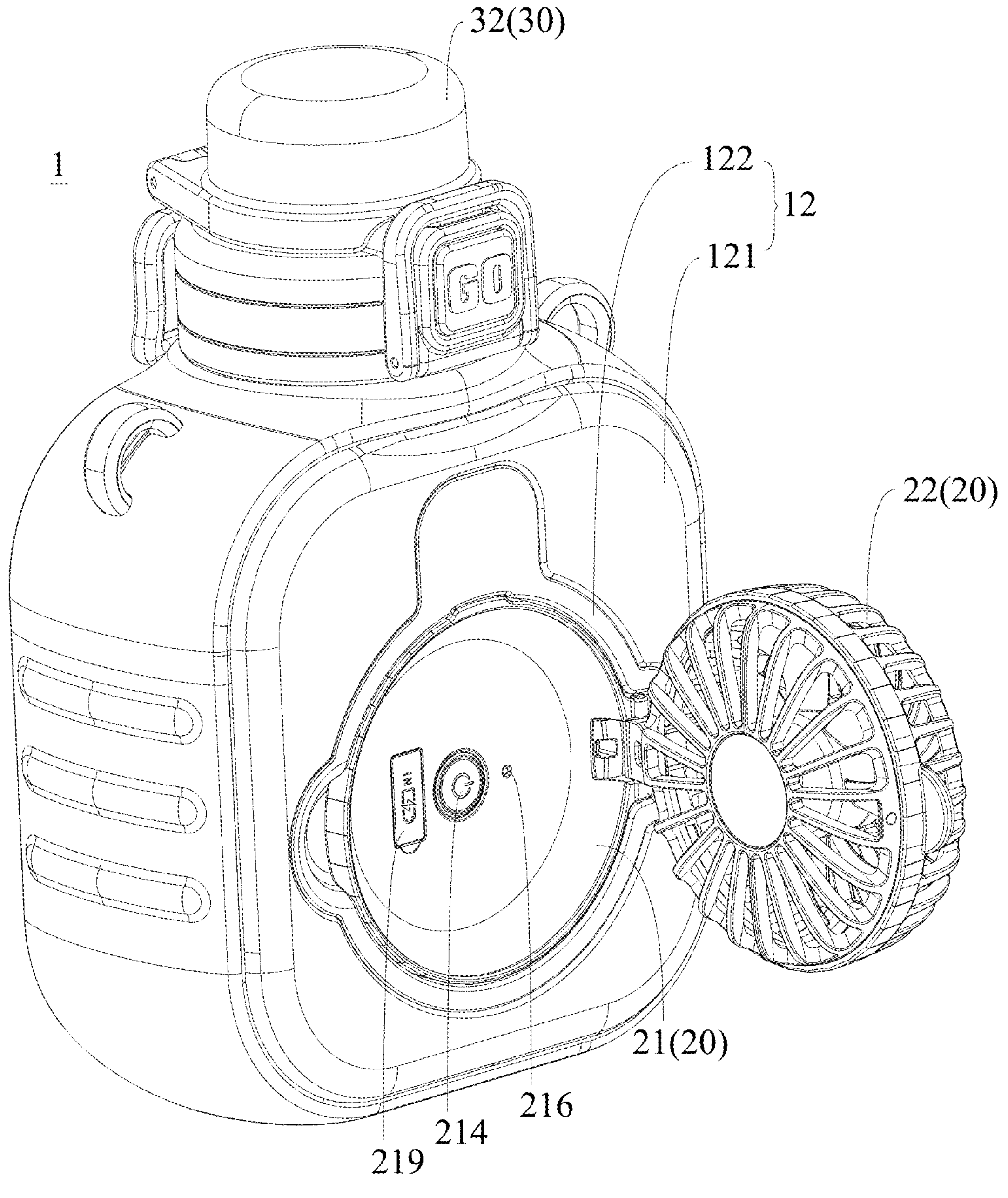
FIG. 19 is a three-dimensional diagram of a fan head in FIG. 18 in an unfolded state.
Figure 20:
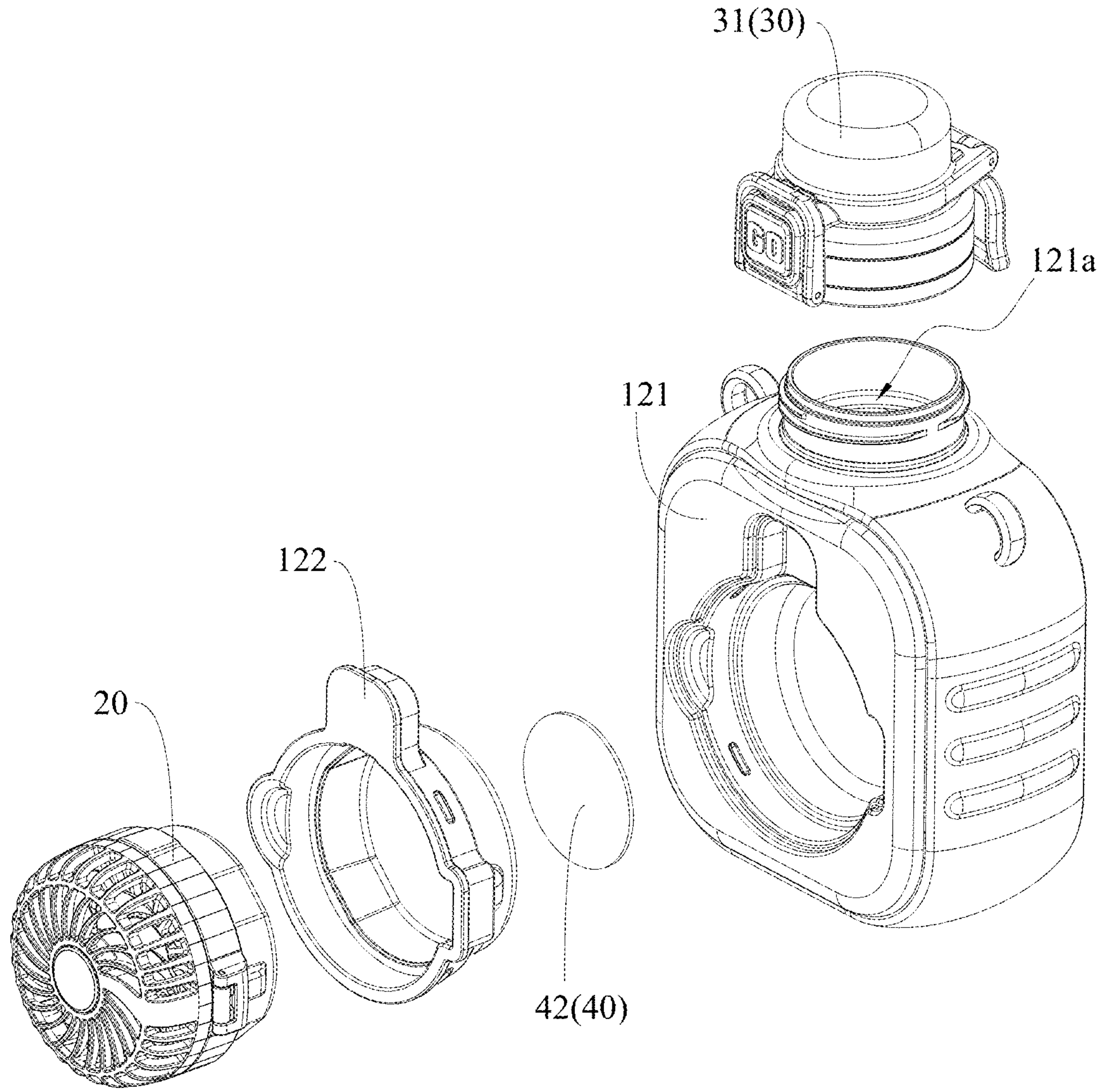
FIG. 20 is a first partially exploded diagram of the water cup with the fan in FIG. 18.
Figure 21:
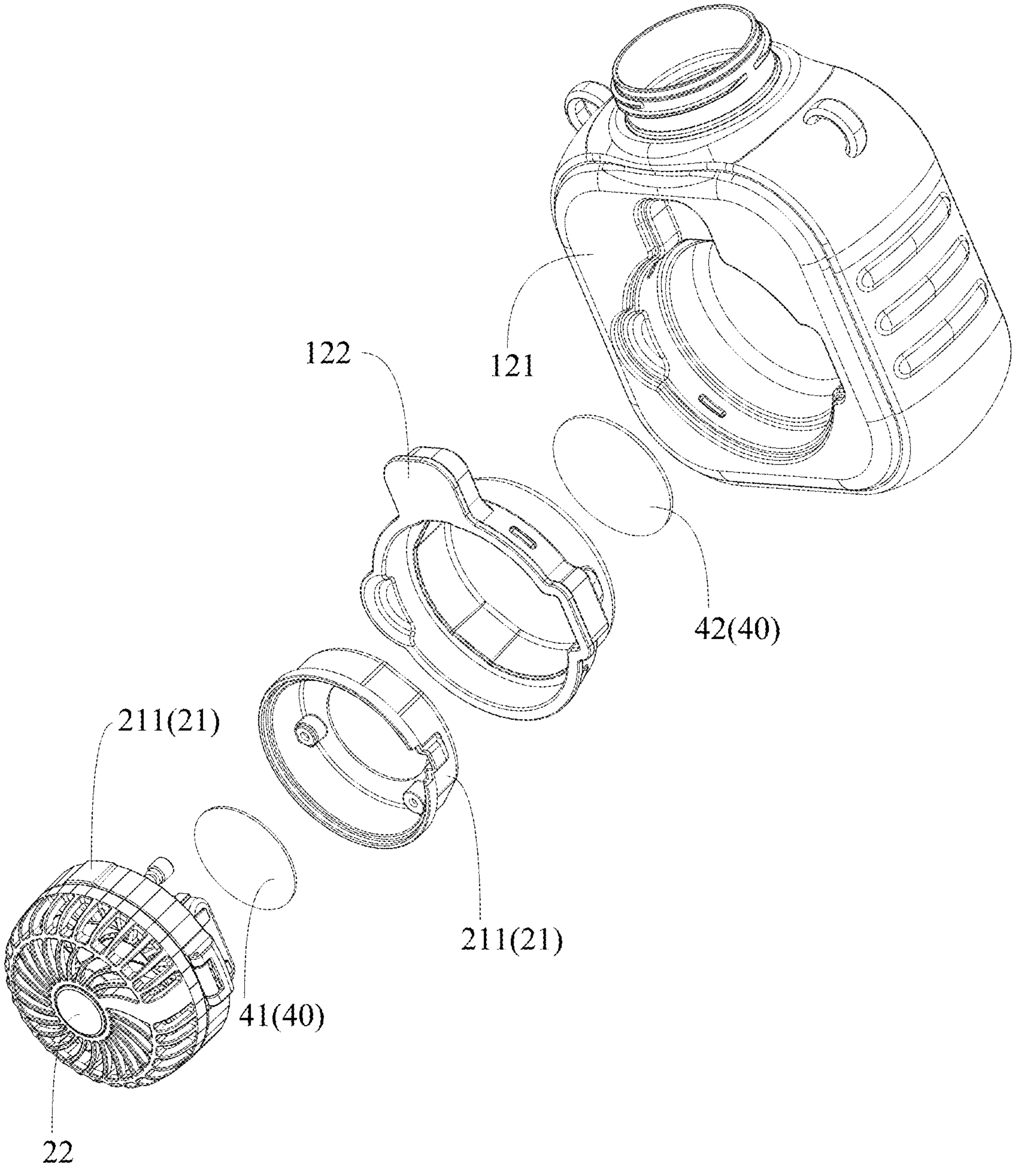
FIG. 21 is a second partially exploded diagram of the water cup with the fan in FIG. 18.
Figure 22:
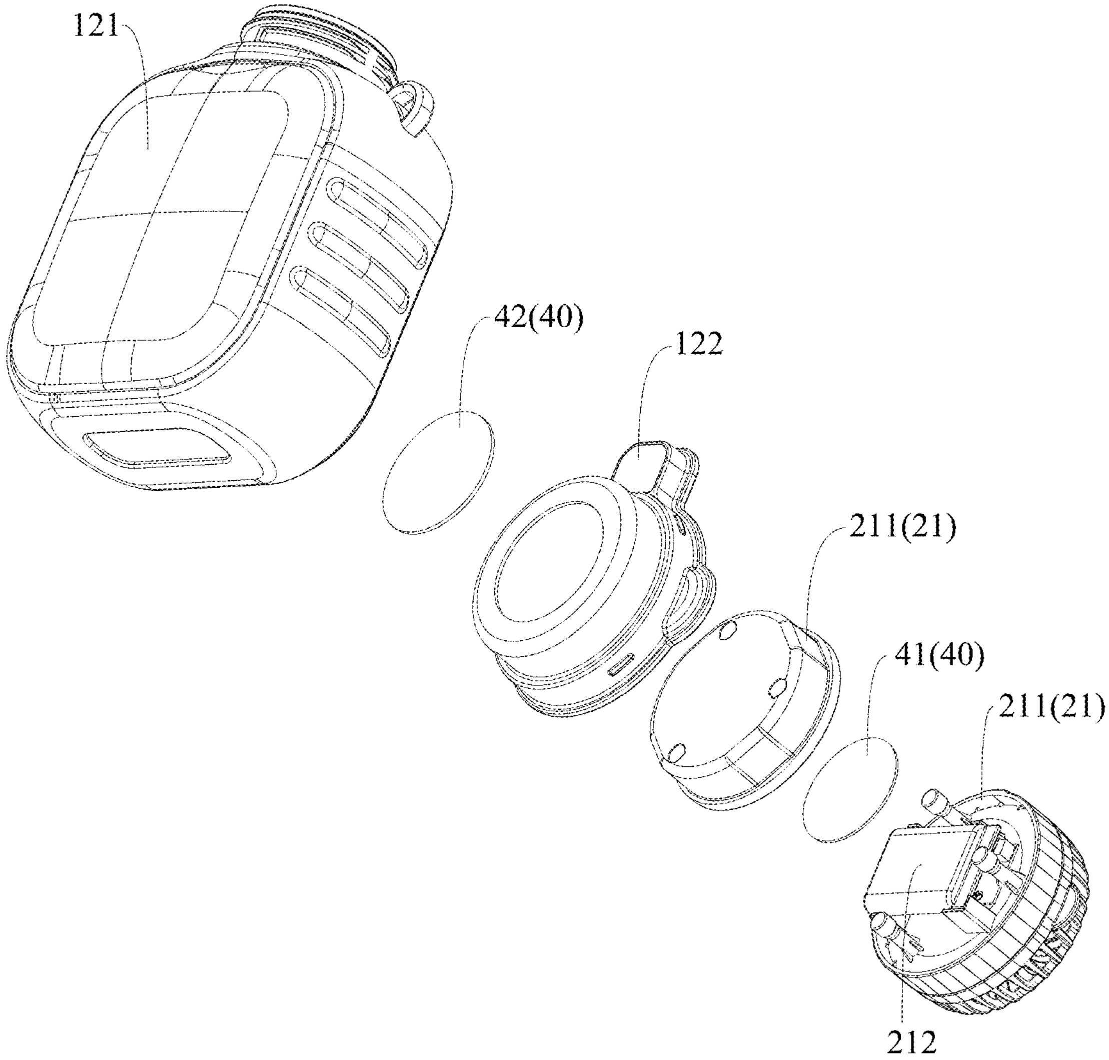
FIG. 22 is a partially exploded diagram of the water cup with the fan in FIG. 21 in another viewing angle.

As shown in FIG. 15 to FIG. 17, the water cup 1 with the fan further includes a cup lid assembly 30. The cup lid assembly 30 corresponds to an opening of the accommodating cavity 121*a* and is connected to the side wall structure 12. The cup lid assembly 30 includes a main lid body 31, a flip lid 32, and a straw structure 33. The main lid body 31 is in threaded connection with the side wall structure 12. One side of the flip lid 32 is rotatably connected to the main lid body 31. Another side of the flip lid 32 can be connected to the main lid body 31 through a buckle to open or close the flip lid 32. The straw structure 33 is connected to the main lid body 31. The straw structure 33 is not the focus of invention of the present disclosure. A specific structure of the straw structure 33 will not be elaborated here. The designer can make a proper design according to an actual need. The cup lid assembly 30 further includes a sealing ring 34. A material of the sealing ring 34 can include, but is not limited to, elastic rubber, elastic silica gel, or the like. The sealing ring 34 is arranged on the main lid body 31 to seal the opening of the accommodating cavity 121*a*.

Embodiment II

Referring to FIG. 18 to FIG. 22, Embodiment II of the present disclosure provides a water cup 1 with a fan. It should be noted that the water cup 1 with the fan in Embodiment II of the present disclosure is structurally the same as the water cup 1 with the fan in Embodiment I of the present disclosure (refer to the introduction of Embodiment I). The water cup 1 with the fan in Embodiment II is described below only in terms of differences from the water cup 1 with the fan in Embodiment I.

It can be understood that in Embodiment I described above, the latching part 1222*a*2 resists against an inside of the buckling slot 20*a* of the fan assembly 20 to detachably arrange the fan assembly 20 in the storage slot 122*a* of the fan mounting member 122. However, a difference is that the fan assembly 20 is detachably arranged in the storage slot 122*a* of the fan mounting member 122 through at least one of a magnetic attraction structure, a buckle structure, and a thread structure.

For example, in this embodiment, as shown in FIG. 18 to FIG. 22, the fan assembly 20 is detachably arranged in the storage slot 122*a* of the fan mounting member 122 in a magnetic attraction manner. The water cup 1 with the fan further includes a magnetic attraction structure 40. The magnetic attraction structure 40 includes a first magnet 41 and a second magnet 42. The first magnet 41 is arranged on the fan assembly 20 (specifically the housing 211 described above), and the second magnet 42 is arranged on the fan mounting member 122. The first magnet 41 and the second magnet 42 have opposite magnetic polarities, and a magnetic attraction force is applicable to being generated between the first magnet 41 and the second magnet 42. The fan assembly 20 is positioned on the fan mounting member 122 under the magnetic attraction force, thereby implementing relative fixation of positions of the fan assembly 20 and the fan mounting member 122. The fan assembly 20 can be removed from the fan mounting member 122 by applying an external force to the fan assembly 20 to counteract the magnetic attraction force between the first magnet 41 and the second magnet 42.

Embodiment III

Figure 23:
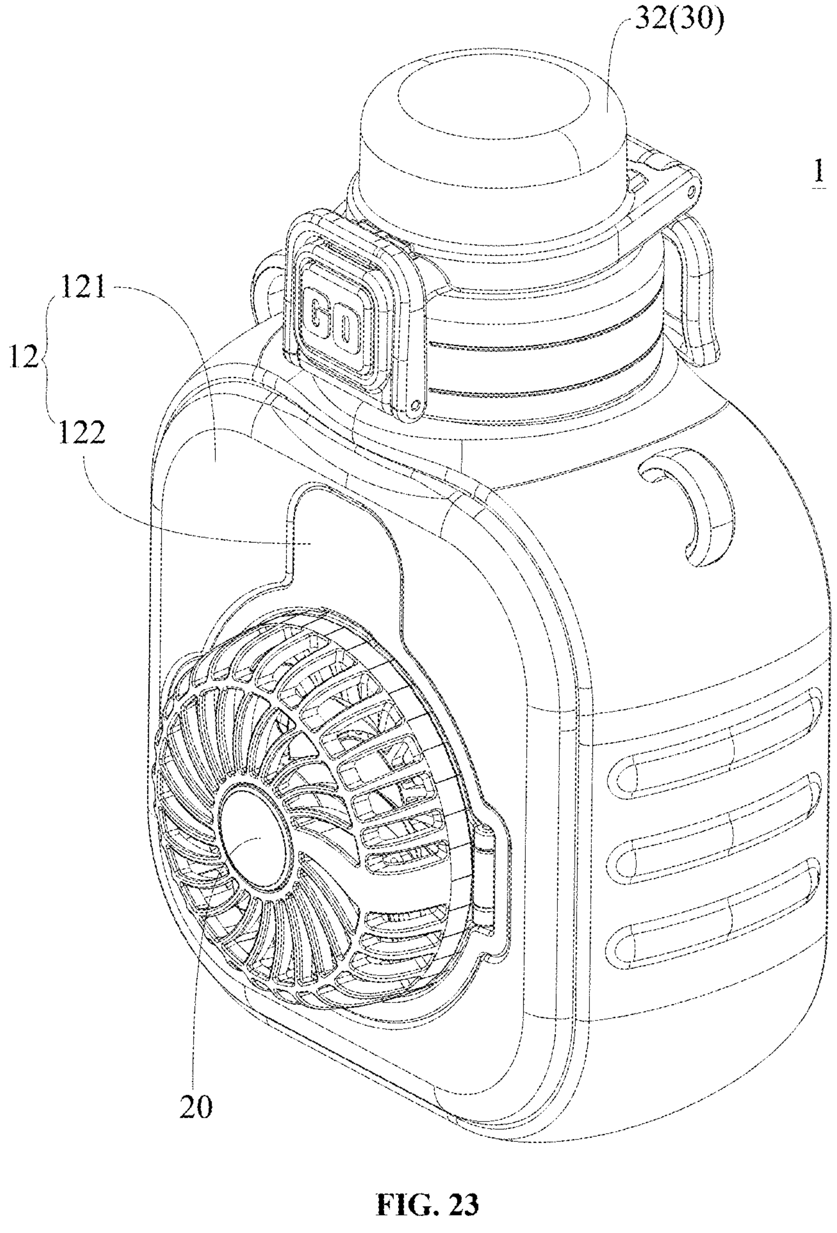
FIG. 23 is a three-dimensional diagram of a water cup with a fan in Embodiment III of the present disclosure.
Figure 24:
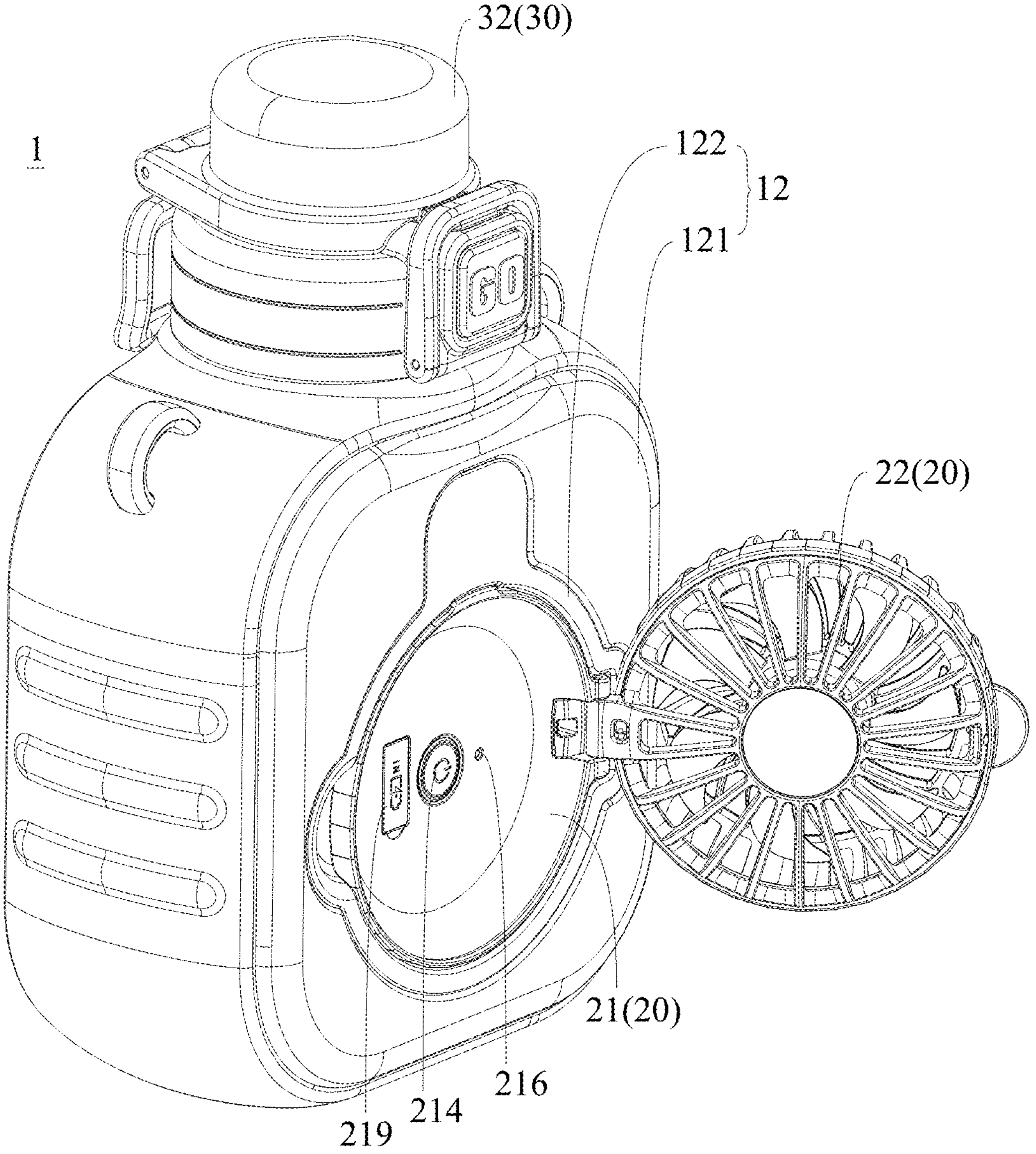
FIG. 24 is a three-dimensional diagram of a fan head in FIG. 23 in an unfolded state.
Figure 25:
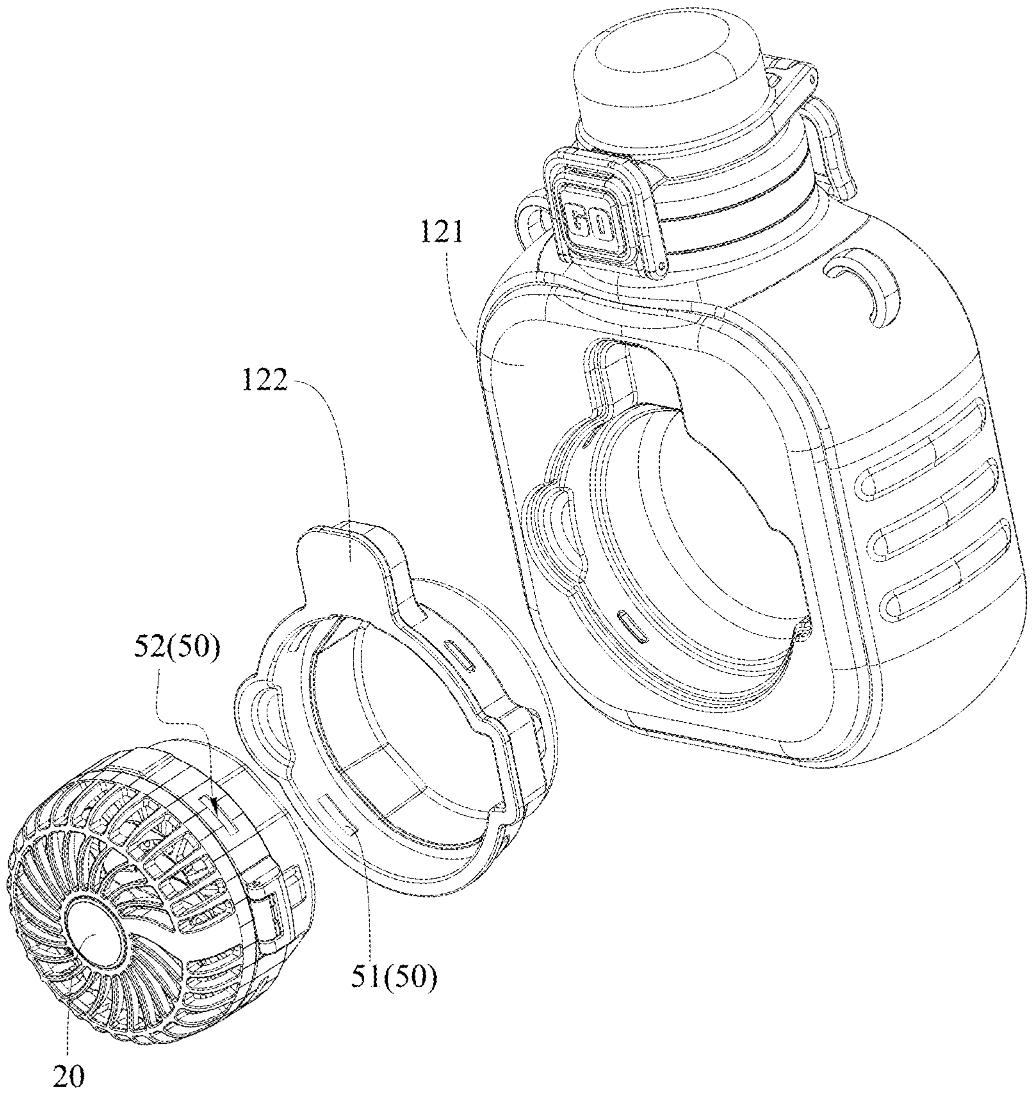
FIG. 25 is a partially exploded diagram of the water cup with the fan in FIG. 23.

Referring to FIG. 23 to FIG. 25, Embodiment III of the present disclosure provides a water cup 1 with a fan. It should be noted that the water cup 1 with the fan in Embodiment III of the present disclosure is structurally the same as the water cup 1 with the fan in Embodiment I of the present disclosure (refer to the introduction of Embodiment I). The water cup 1 with the fan in Embodiment III is described below only in terms of differences from the water cup 1 with the fan in Embodiment I.

It can be understood that in Embodiment I described above, the latching part 1222*a*2 resists against an inside of the buckling slot 20*a* of the fan assembly 20 to detachably arrange the fan assembly 20 in the storage slot 122*a* of the fan mounting member 122. However, a difference is that the fan assembly 20 is detachably arranged in the storage slot 122*a* of the fan mounting member 122 through at least one of a magnetic attraction structure, a buckle structure, and a thread structure.

For example, in this embodiment, as shown in FIG. 23 to FIG. 25, the fan assembly 20 is detachably arranged in the storage slot 122*a* of the fan mounting member 122 in a buckling or clamping manner. The water cup 1 with the fan further includes a buckle structure 50. The buckle structure 50 includes a clamping flange 51 and a clamping slot 52. At least one of the clamping flange 51 and the clamping slot 52 is arranged on the fan assembly 20 (specifically the housing 211 described above), and the other one of the clamping flange 51 and the clamping slot 52 is arranged on the fan mounting member 122. The clamping flange 51 is clamped to the clamping slot 52, and the fan assembly 20 is positioned on the fan mounting member 122 under a clamping force generated by clamping fit between the clamping flange 51 and the clamping slot 52, thereby implementing relative fixation of positions of the fan assembly 20 and the fan mounting member 122. The fan assembly 20 can be removed from the fan mounting member 122 by applying an external force to the fan assembly 20 to counteract the clamping force between the clamping flange 51 and the clamping slot 52.

Embodiment IV

Figure 26:
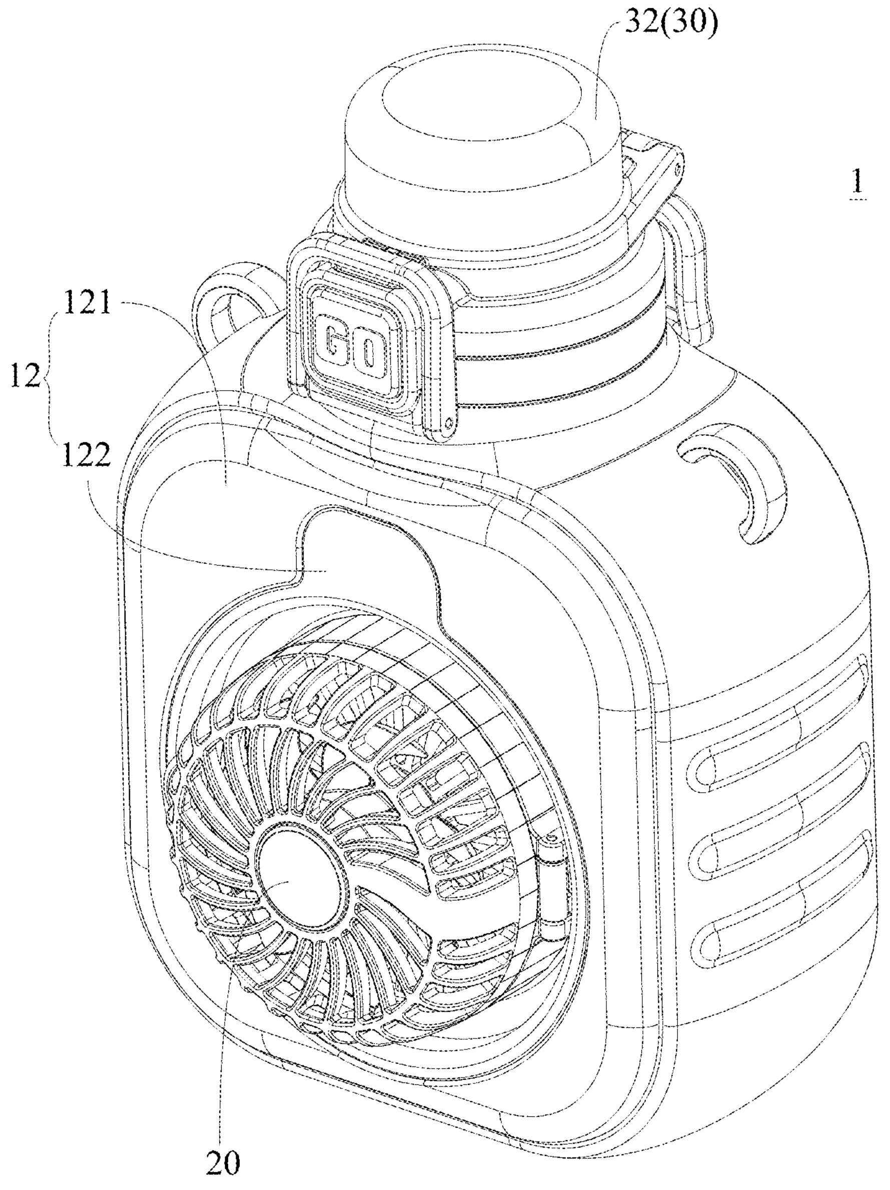
FIG. 26 is a three-dimensional diagram of a water cup with a fan in Embodiment IV of the present disclosure.
Figure 27:
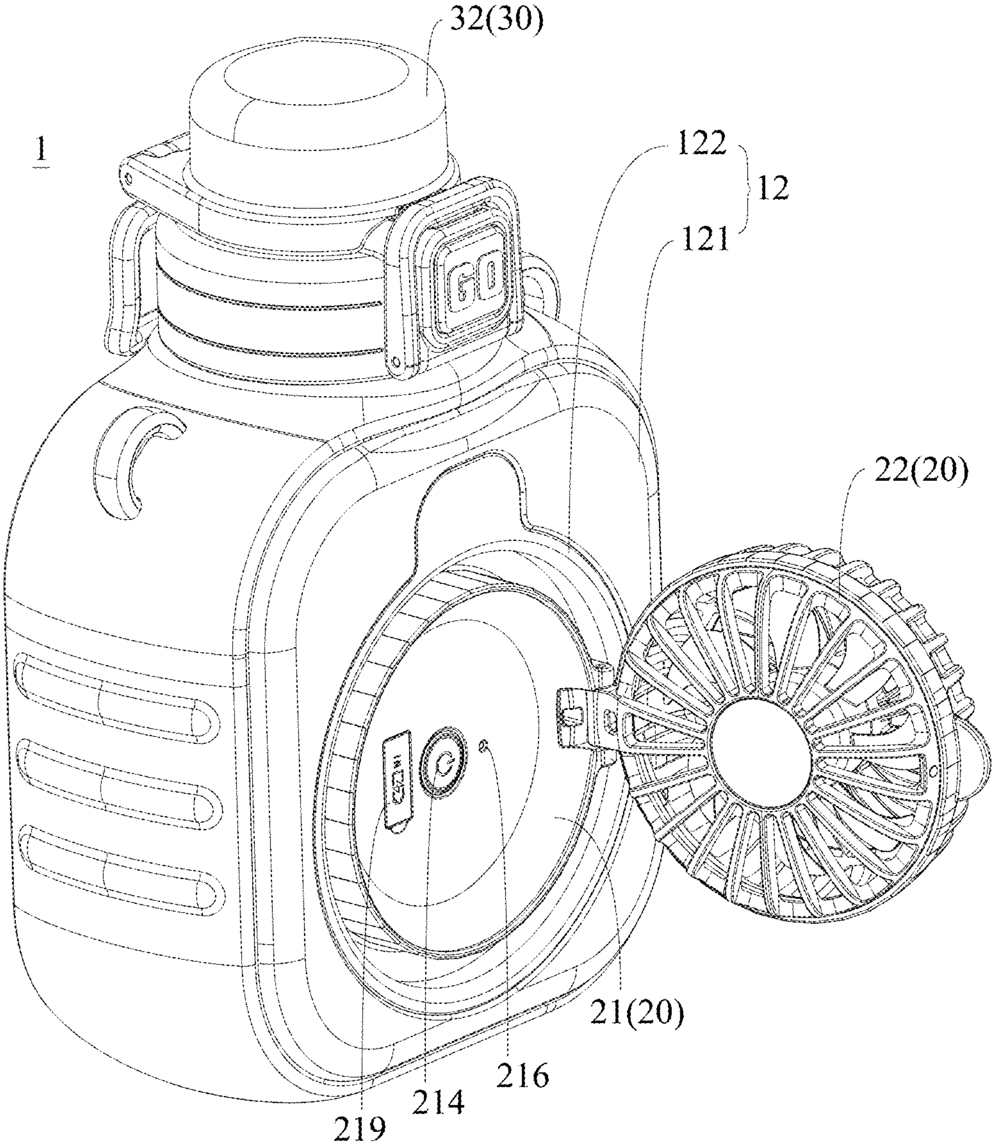
FIG. 27 is a three-dimensional diagram of a fan head in FIG. 26 in an unfolded state.
Figure 28:
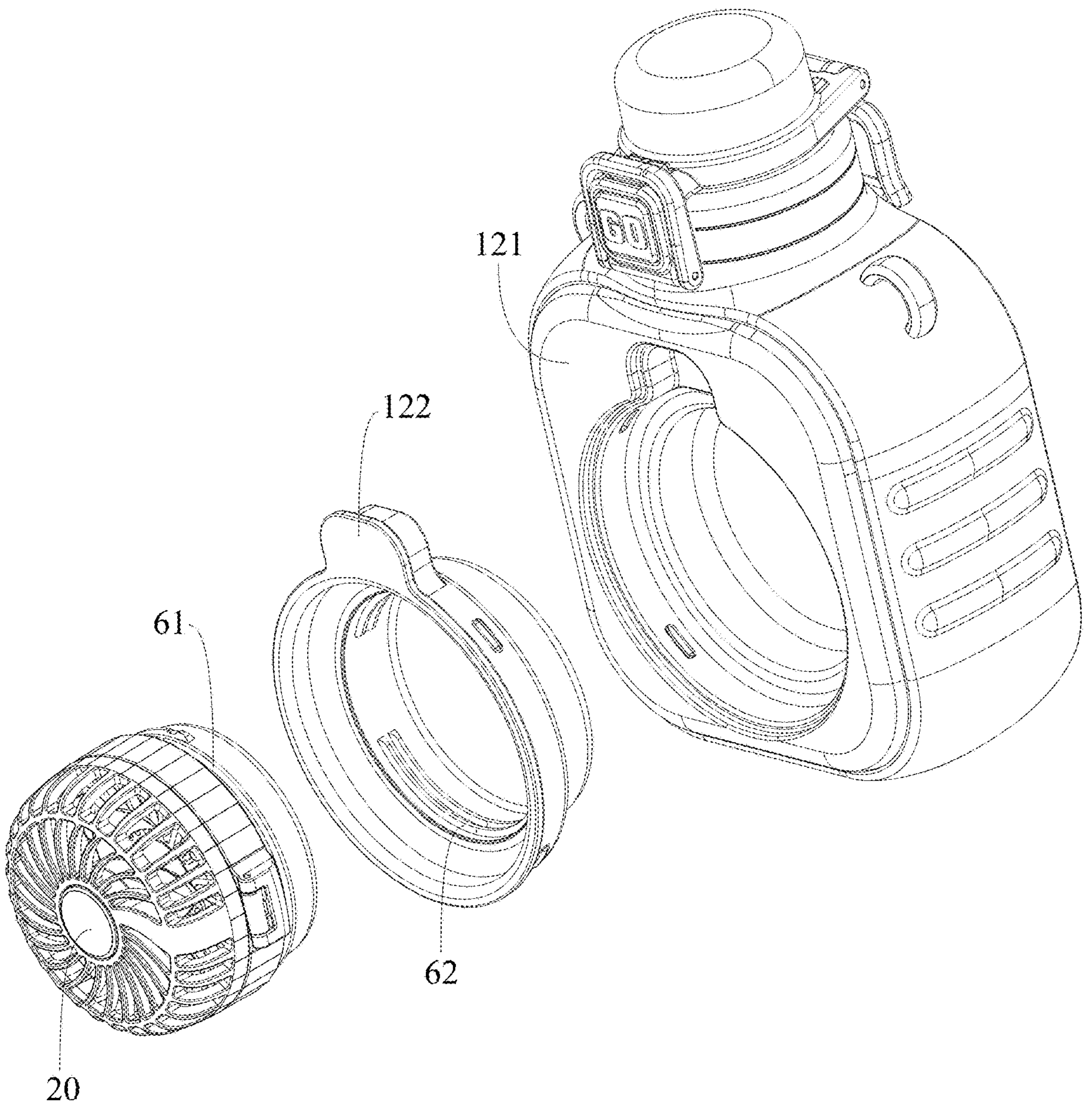
FIG. 28 is a partially exploded diagram of the water cup with the fan in FIG. 26.

Referring to FIG. 26 to FIG. 28, Embodiment IV of the present disclosure provides a water cup 1 with a fan. It should be noted that the water cup 1 with the fan in Embodiment IV of the present disclosure is structurally the same as the water cup 1 with the fan in Embodiment I of the present disclosure (refer to the introduction of Embodiment I). The water cup 1 with the fan in Embodiment IV is described below only in terms of differences from the water cup 1 with the fan in Embodiment I.

It can be understood that in Embodiment I described above, the latching part **1222*a*2 resists against an inside of the buckling slot 20*a* of the fan assembly 20 to detachably arrange the fan assembly 20 in the storage slot 122*a* of the fan mounting member 122. However, a difference is that the fan assembly 20 is detachably arranged in the storage slot 122*a* of the fan mounting member 122** through at least one of a magnetic attraction structure, a buckle structure, and a thread structure.

For example, in this embodiment, as shown in FIG. 26 to FIG. 28, the fan assembly 20 is detachably arranged in the storage slot **122*a* of the fan mounting member 122 in a threaded connection manner. The fan assembly 20 (specifically the housing 211 described above) is provided with an external thread 61, and the fan mounting member 122 is provided with an internal thread 62. The external thread 61 is in threaded connection with the internal thread 62. The fan assembly 20 is positioned on the fan mounting member 122 under a force generated by cooperation between the external thread 61 and the internal thread 62, thereby implementing relative fixation of positions between the fan assembly 20 and the fan mounting member 122. Rotating the fan assembly 20 to disengage the external thread 61 from the internal thread 62 can remove the fan assembly 20 from the fan mounting member 122**.

Embodiment V

Referring to FIG. 29 to FIG. 36, Embodiment V of the present disclosure provides a water cup 1 with a fan. It should be noted that the water cup 1 with the fan in Embodiment V of the present disclosure is structurally the same as the water cup 1 with the fan in Embodiment I of the present disclosure (refer to the introduction of Embodiment I). The water cup 1 with the fan in Embodiment V is described below only in terms of differences from the water cup 1 with the fan in Embodiment I.

Figure 29:
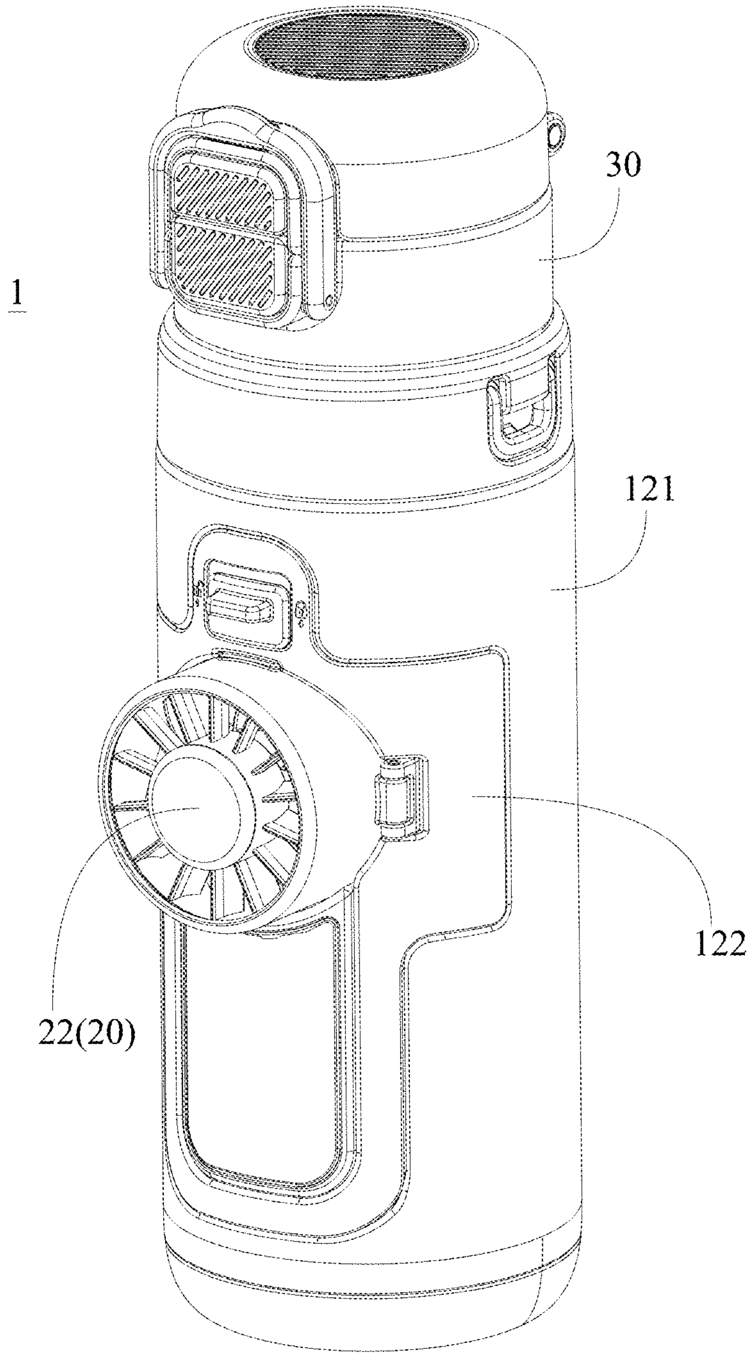
FIG. 29 is a first three-dimensional diagram of a water cup with a fan in Embodiment V of the present disclosure.
Figure 30:
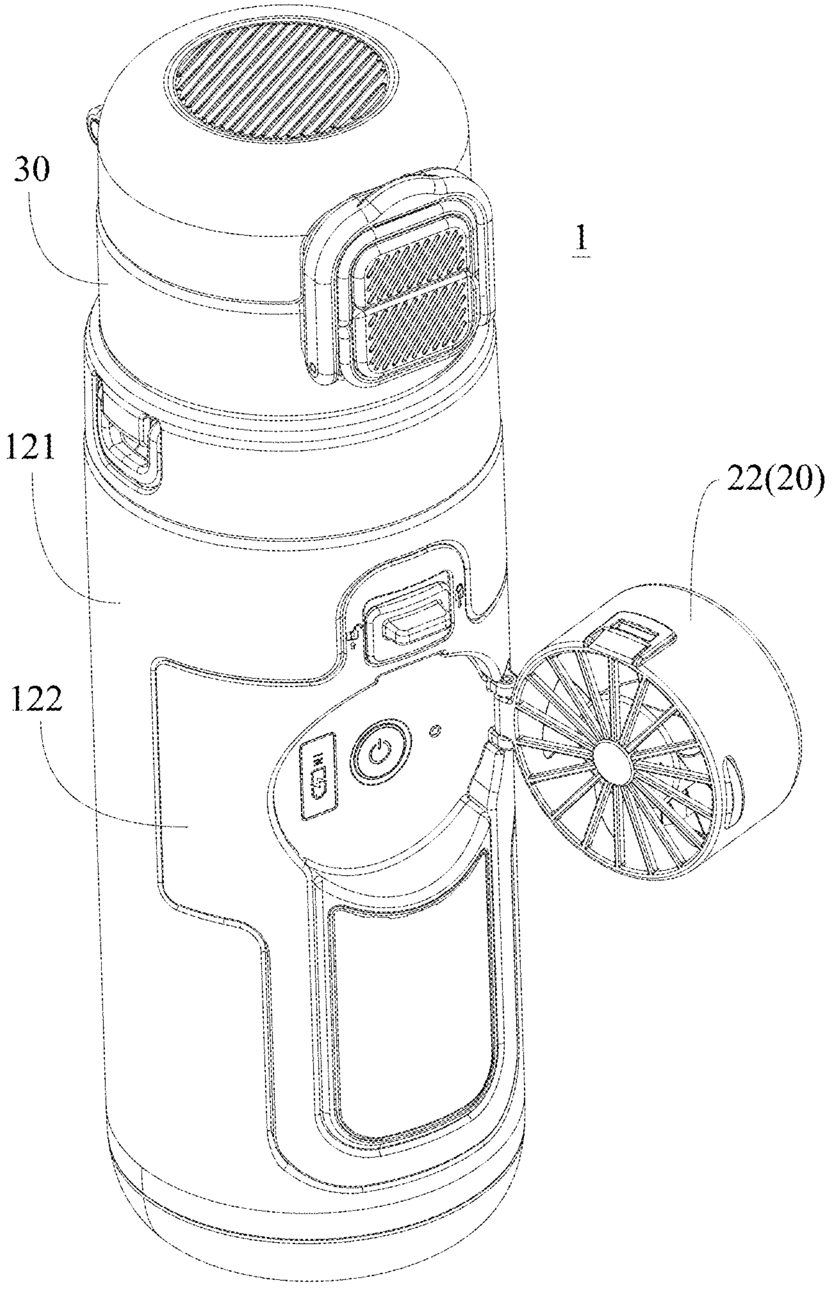
FIG. 30 is a three-dimensional diagram of a fan head in FIG. 29 in an unfolded state.
Figure 31:
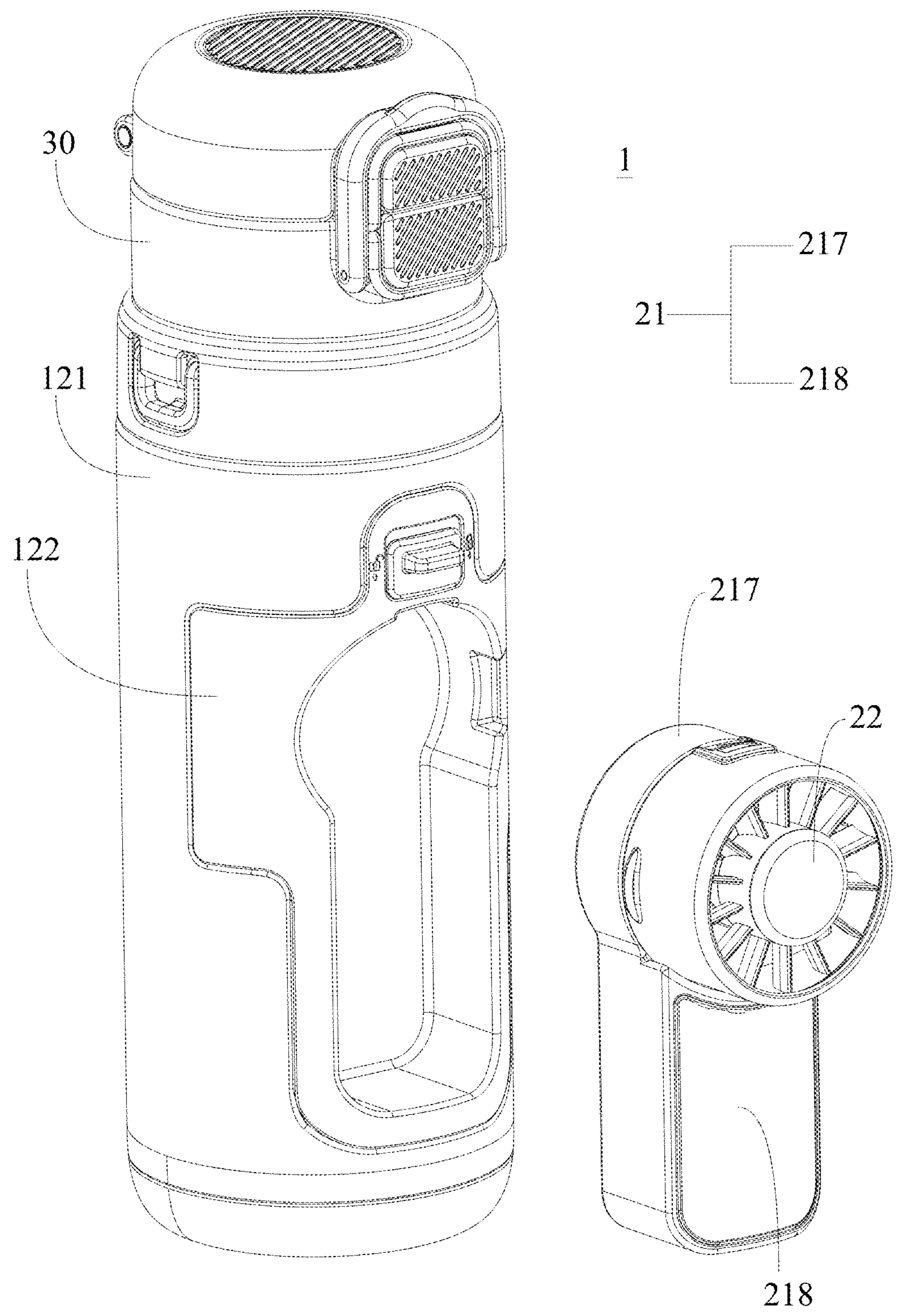
FIG. 31 is a partially exploded diagram of the water cup with the fan in FIG. 29.
Figure 32:
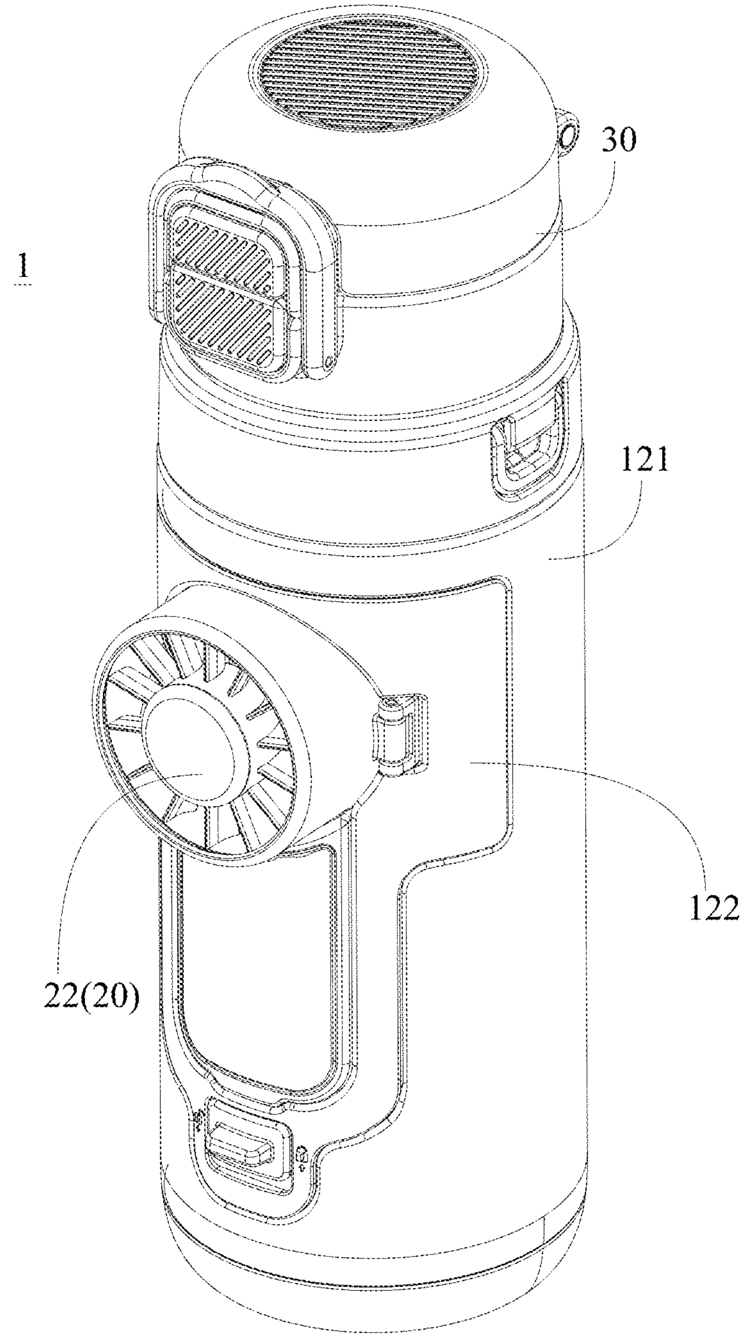
FIG. 32 is a second three-dimensional diagram of a water cup with a fan in Embodiment V of the present disclosure.
Figure 33:
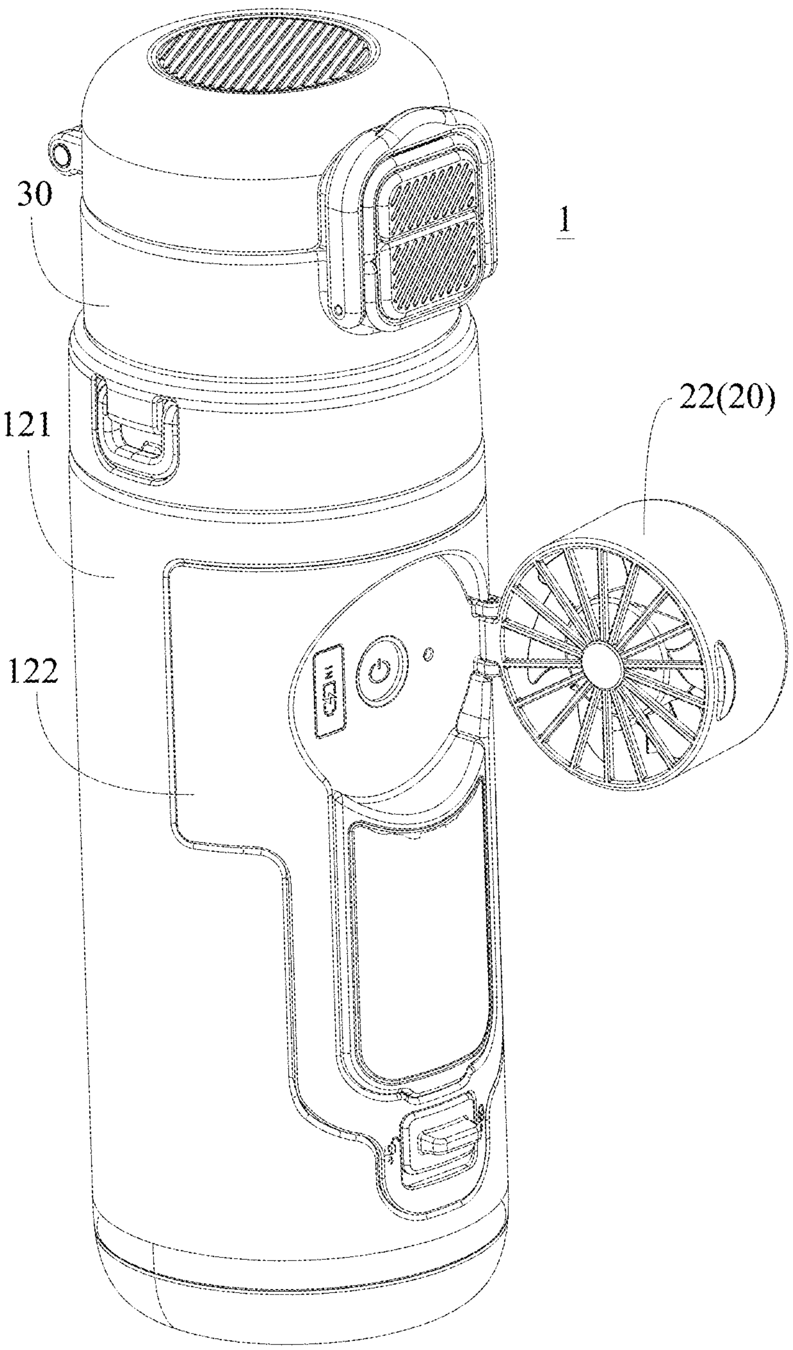
FIG. 33 is a three-dimensional diagram of a fan head in FIG. 32 in an unfolded state.
Figure 34:
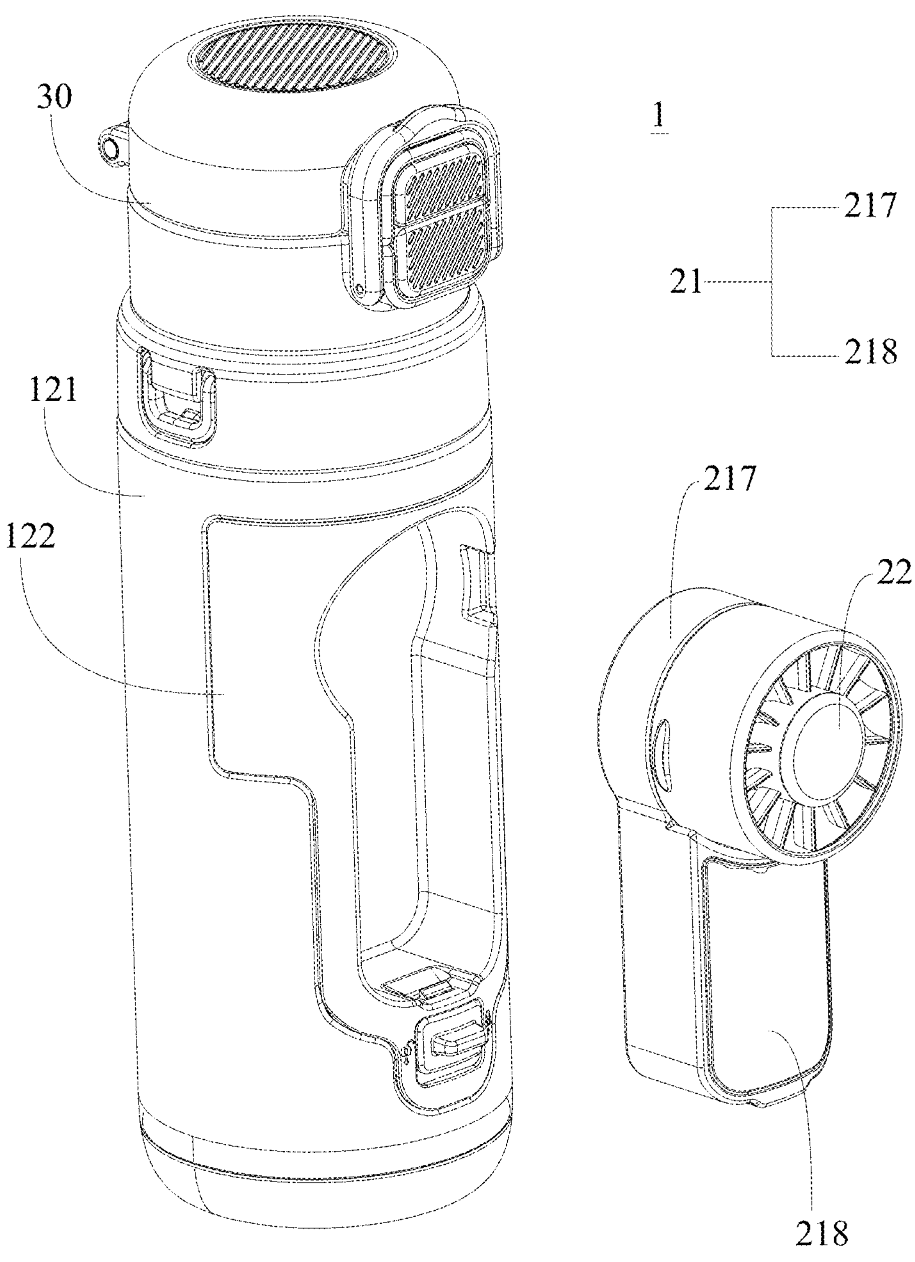
FIG. 34 is a partially exploded diagram of the water cup with the fan in FIG. 32.
Figure 35:
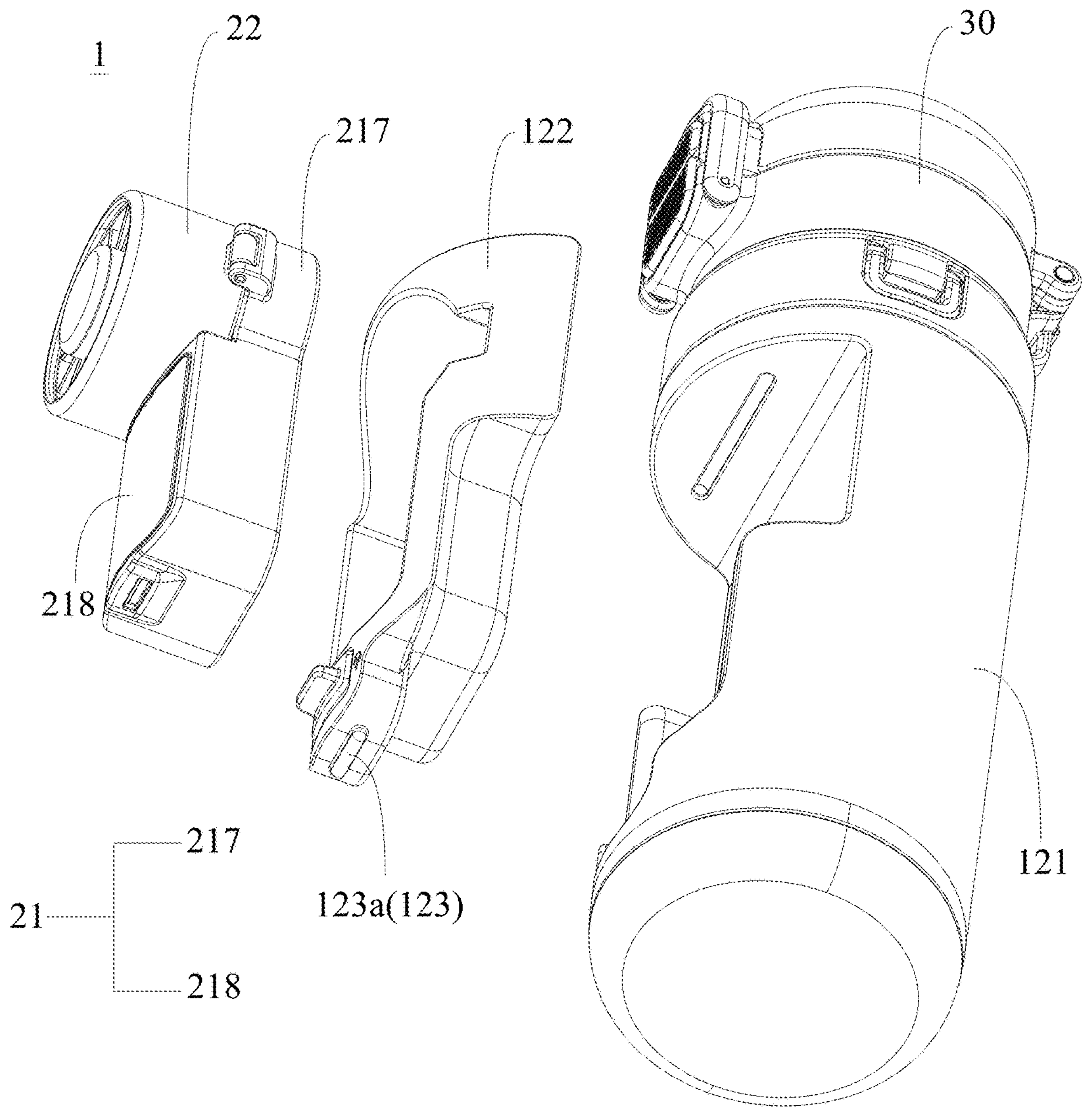
FIG. 35 is an exploded diagram of the water cup with the fan in FIG. 32.
Figure 36:
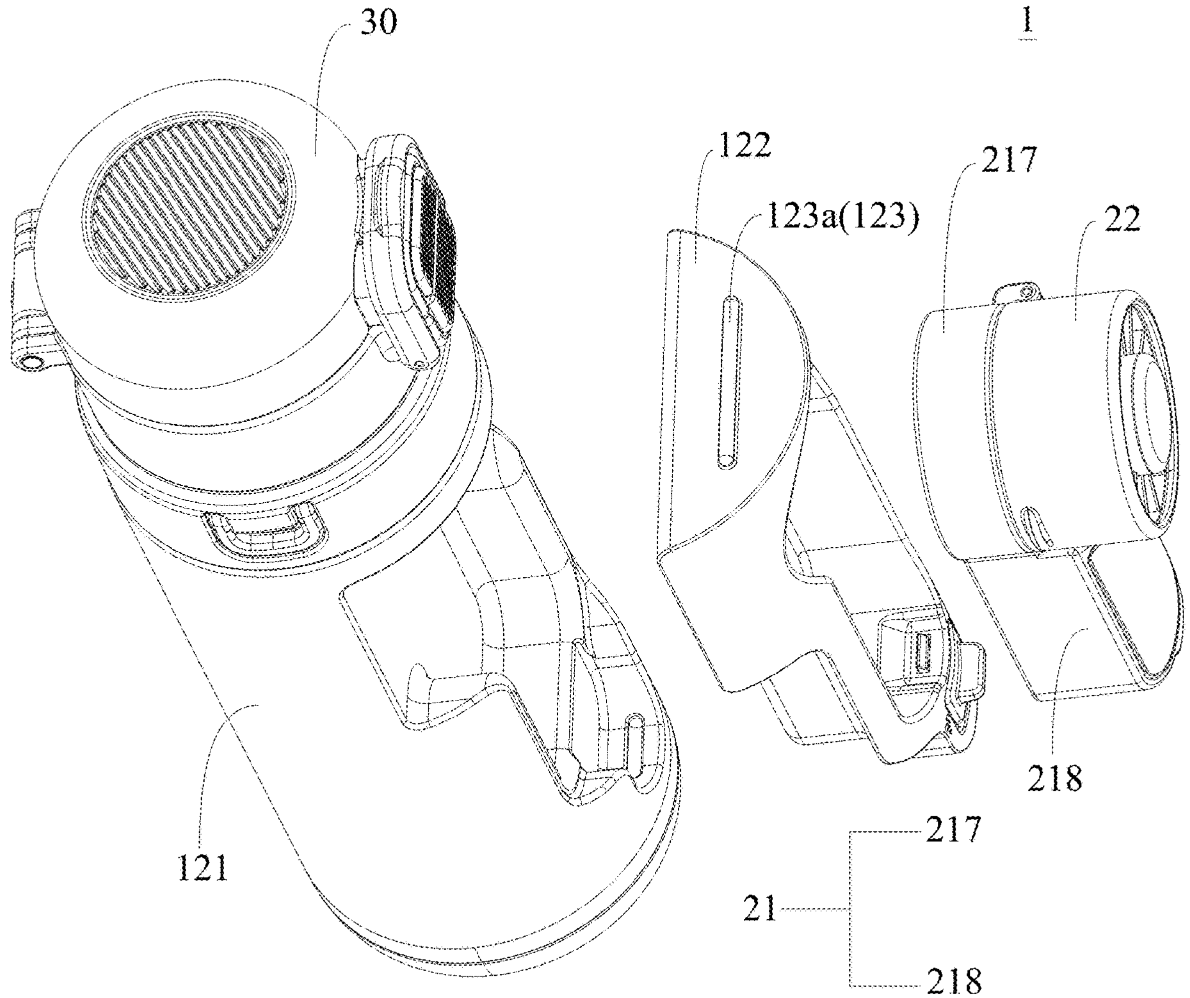
FIG. 36 is an exploded diagram of the water cup with the fan in FIG. 32 in another viewing angle.
Figure 37:
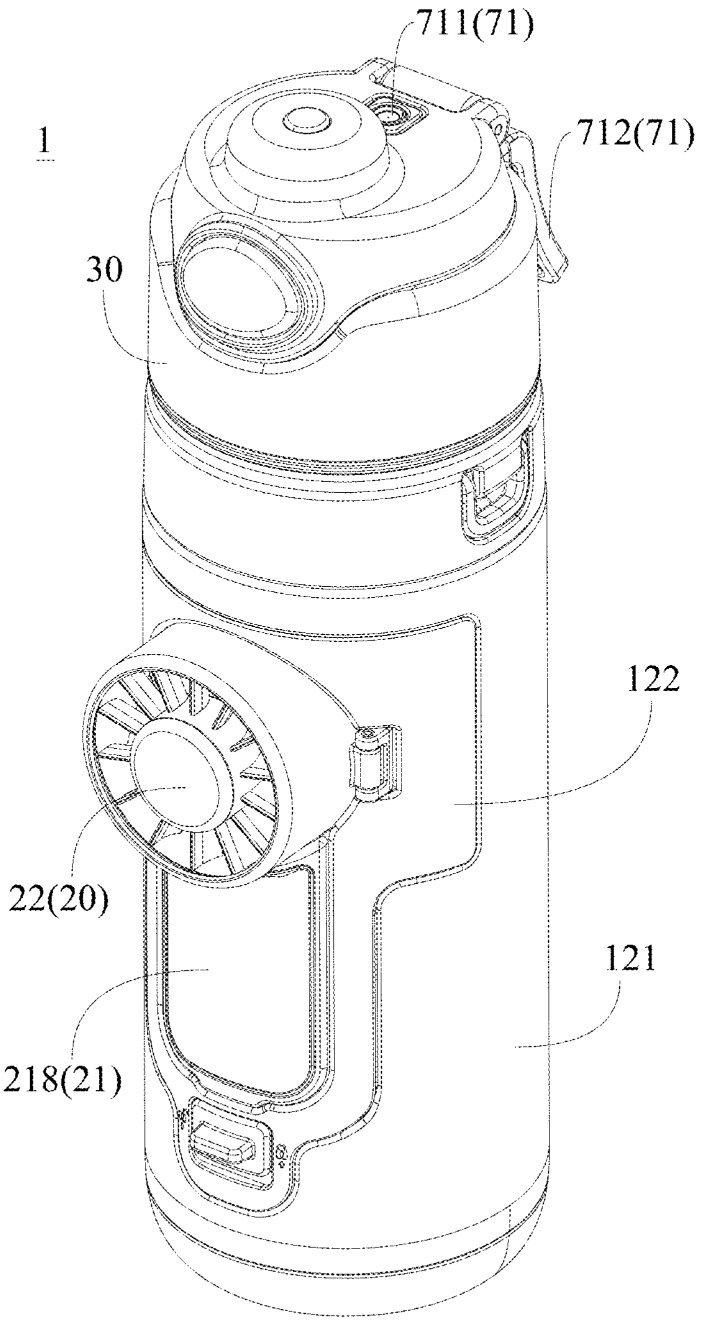
FIG. 37 is a three-dimensional diagram of a water cup with a fan in Embodiment VI of the present disclosure.
Figure 38:
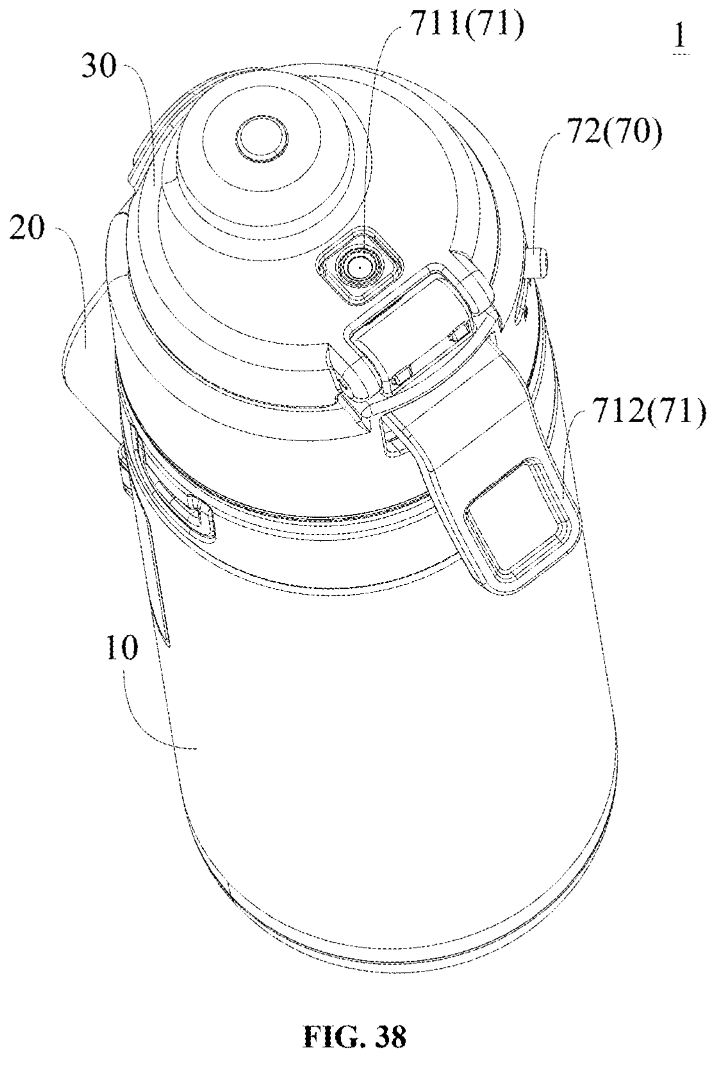
FIG. 38 is a three-dimensional diagram of the water cup with the fan in FIG. 37 in another viewing angle.
Figure 39:
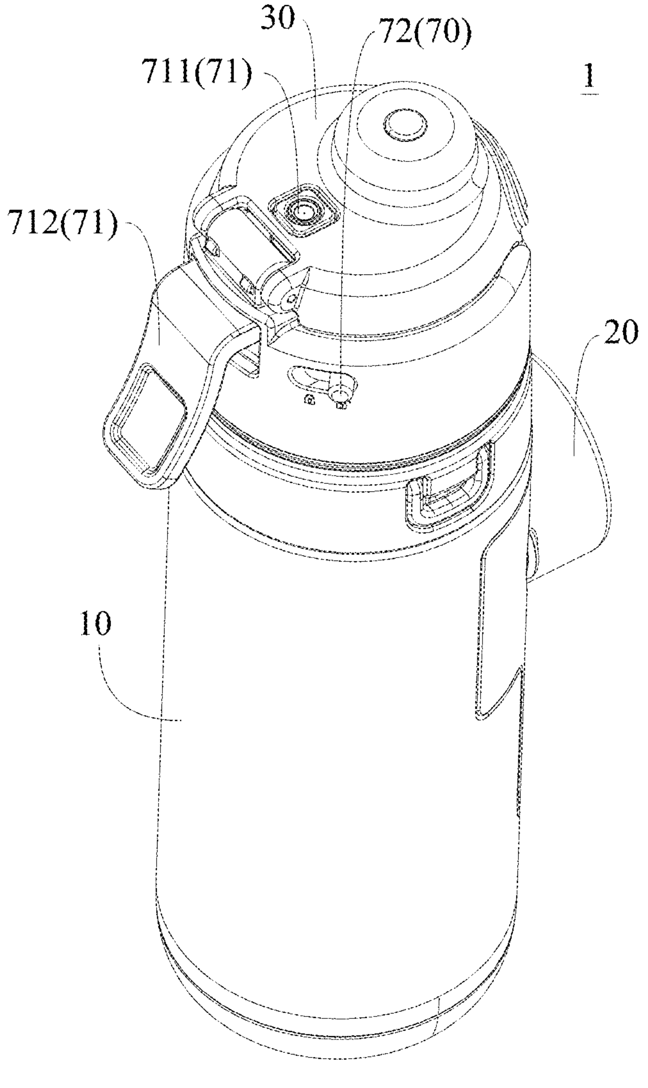
FIG. 39 is a three-dimensional diagram of the water cup with the fan in FIG. 37 in still another viewing angle.
Figure 40:
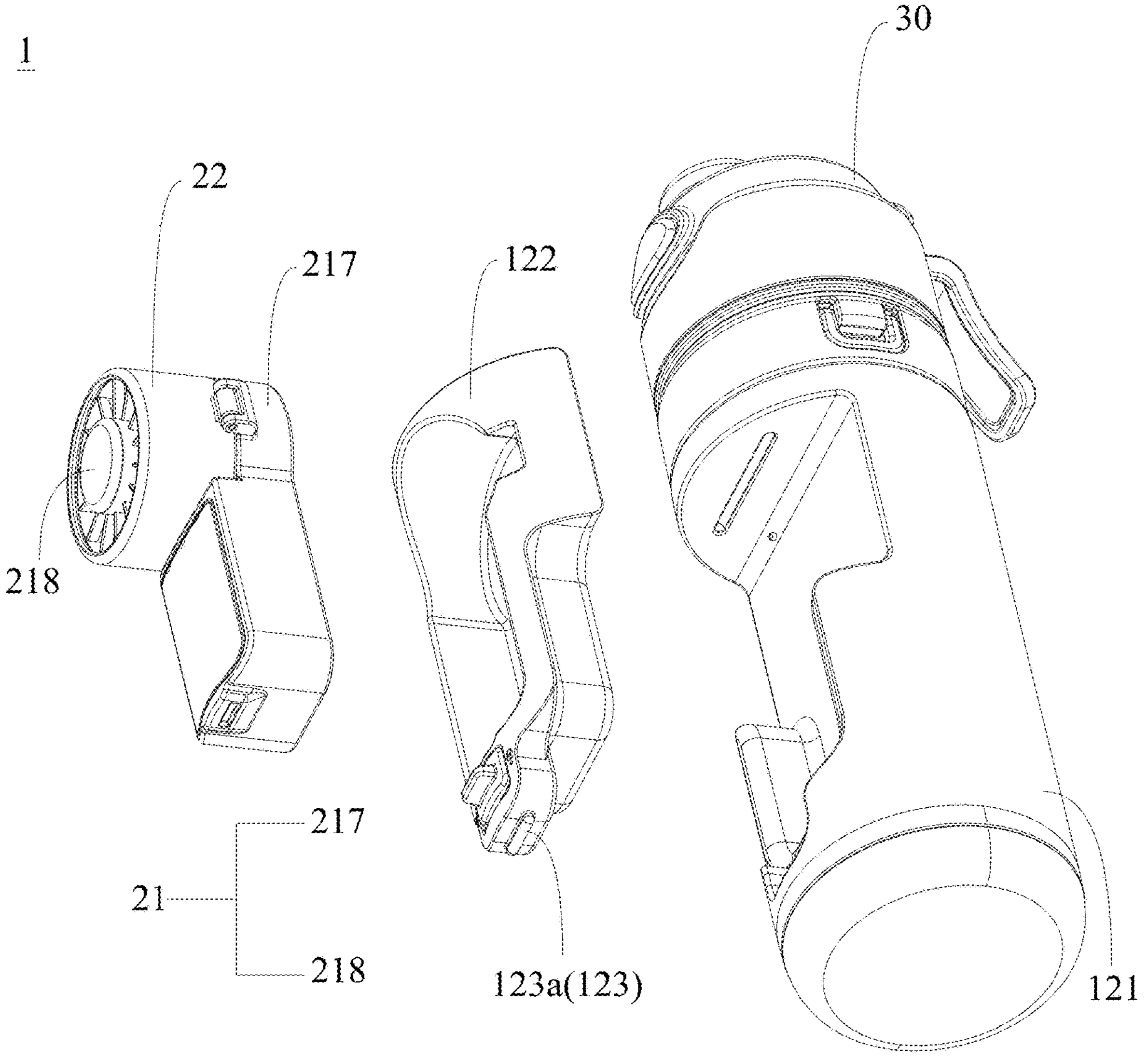
FIG. 40 is an exploded diagram of the water cup with the fan in FIG. 37.
Figure 41:
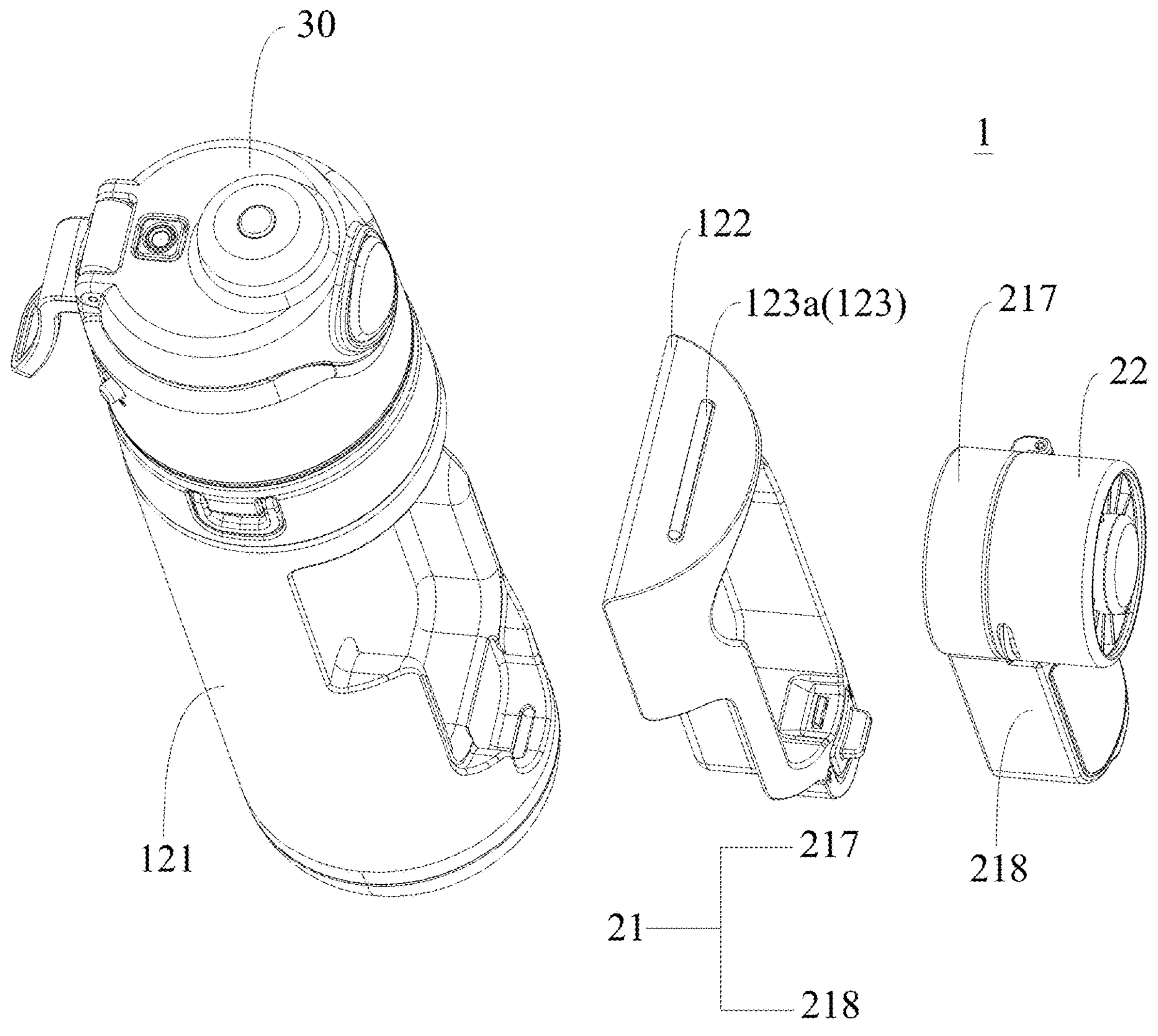
FIG. 41 is an exploded diagram of the water cup with the fan in FIG. 37 in another viewing angle.

In this embodiment, as shown in FIG. 29 to FIG. 36, when the side wall body 121 and the bottom plate 11 are enclosed to form a cylindrical back body, the base 21 includes a supporting base 217 that can be folded with the fan head 22 and a handle 218 connected to the supporting base 217. The fan assembly 20 is a handheld fan assembly 20. The fan head 22 is movably connected to the supporting base 217. As shown in FIG. 29 to FIG. 31, the supporting base 217 has the buckling slot **20*a*, or as shown in FIG. 32 to FIG. 36, the handle 218 has the buckling slot 20*a*. In this way, a user can remove the fan assembly 20 from the fan mounting member 122 according to an actual need and be cooled down by directly holding the handle 218**.

Embodiment VI

Referring to FIG. 37 to FIG. 41, Embodiment VI of the present disclosure provides a water cup 1 with a fan. It should be noted that the water cup 1 with the fan in Embodiment VI of the present disclosure is structurally the same as the water cup 1 with the fan in Embodiment I of the present disclosure (refer to the introduction of Embodiment I). The water cup 1 with the fan in Embodiment VI is described below only for differences from the water cup 1 with the fan in Embodiment I.

In this embodiment, as shown in FIG. 37 to FIG. 41, when the side wall body 121 and the bottom plate 11 are enclosed to form a cylindrical back body, the base 21 includes a supporting base 217 that can be folded with the fan head 22 and a handle 218 connected to the supporting base 217. The fan assembly 20 is a handheld fan assembly 20. The fan head 22 is movably connected to the supporting base 217. The handle 218 has the buckling slot **20*a*. In this way, a user can remove the fan assembly 20 from the fan mounting member 122 according to an actual need and be cooled down by directly holding the handle 218**.

The water cup 1 with the fan further includes a spraying assembly 70. The spraying assembly 70 includes a nozzle structure 71 and a limiting member 72. The nozzle structure 71 is mounted on the main lid body 31. A nozzle 711 of the nozzle structure 71 is exposed through an opening on a top shell of the flip lid 32. A pipeline of the nozzle structure 71 extends into the accommodating cavity **121*a*, and a pressing handle 712 of the nozzle structure 71 is exposed out of the flip lid 32. A user applies a pressure to the pressing handle 712 of the nozzle structure 71 to squeeze air inside a pump chamber, so that water in the accommodating cavity 121*a* is sprayed out from the nozzle 711 of the nozzle structure 71, thus achieving a spraying and cooling effect. The limiting member 72 is movably connected to the flip lid 32. The limiting member 72 can switch between a locked position and a released position. When the limiting member 72 is in the locking position, the limiting member 72 resists against the pressing handle 712 of the nozzle structure 71 to restrict the pressing handle 712 of the nozzle structure 71 from moving under an external force. In this case, the water inside the accommodating cavity 121*a* cannot be sprayed out from the nozzle 711 of the nozzle structure 71. When the limiting member 72 is in the released position, the limiting member 72 is spaced apart from the pressing handle 712 of the nozzle structure 71, so that the pressing handle 712 of the nozzle structure 71 can move under the external force. In this case, the water inside the accommodating cavity 121*a* can be sprayed out of the nozzle 711 of the nozzle structure 71. When a user does not require spraying and cooling, the user can push the limiting member 72 to place the limiting member 72 in the locked position. This can effectively prevent the water from being sprayed out of the nozzle 711 of the nozzle structure 71 as the user accidentally touches the pressing handle 712 of the nozzle structure 71. When the user requires spraying and cooling, the user can push the limiting member 72 to switch the limiting member 72 to the released position. In this case, the user can apply a pressure to the pressing handle 712 of the nozzle structure 71 to spray water out from the nozzle 711 of the nozzle structure 71**.

The identical or similar numerals in the accompanying drawings in this embodiment correspond to identical or similar components. In the description of the present invention, it should be understood that orientations or positional relationships indicated by the terms “upper”, “lower”, “left”, “right”, and the like are orientations or positional relationships as shown in the drawings, and are only for the purpose of facilitating and simplifying the description of the present invention instead of indicating or implying that devices or elements indicated must have particular orientations, and be constructed and operated in the particular orientations, so that these terms for describing the positional relationships in the accompanying drawings are only used for exemplary illustrations and are not construed as limiting the present invention. A person of ordinary skill in the art can understand the specific meanings of the above terms according to specific situations.

The above is only the preferred embodiments of the present invention, and is not intended to limit the present invention. Any modifications, equivalent replacements and improvements that are made within the spirit and principle of the present invention shall fall within the protection scope of the present invention.

What is claimed is:

1. A water cup with a fan, comprising:

a cup body, wherein the cup body comprises a bottom plate and a side wall structure connected to the bottom plate, and the bottom plate and the side wall structure are enclosed into an accommodating cavity with an opening; and a fan assembly, wherein the fan assembly is capable of being detachably arranged on an outer surface of the side wall structure, wherein the side wall structure comprises a side wall body and a fan mounting member connected to an outer side of the side wall body, wherein the fan mounting member has a storage slot, and the fan assembly is at least partially arranged in the storage slot, wherein the fan mounting member comprises an mounting body and a locking assembly movably connected to the mounting body; the locking assembly is configured to move relative to the mounting body to switch between a locked state and an unlocked state; in the locked state, the locking assembly resists against the fan assembly to fix the fan assembly to the mounting body; and in the unlocked state, the locking assembly releases the fan assembly to cause the fan assembly to be removed from the mounting body.

2. The water cup with the fan according to claim 1, wherein the fan mounting member is connected to the side wall body and the bottom plate into a whole assembly by using a secondary molding process after being separately made; and the side wall body and the bottom plate are enclosed into the accommodating cavity.

3. The water cup with the fan according to claim 2, wherein at least one connection part is arranged on a surface of the fan mounting member that is connected to the side wall body; the at least one connection part comprises at least one of a protrusion and a groove; and the at least one connection part is configured to enlarge an area of connection with the side wall body.

4. The water cup with the fan according to claim 3, wherein the at least one connection part comprises a plurality of protrusions spaced apart.

5. The water cup with the fan according to claim 1, wherein the locking assembly comprises a lock catch and a resetting driving member connected between the lock catch and the mounting body; the lock catch is configured to switch between a locking position for resisting against the fan assembly and an unlocking position for being separated from the fan assembly; and the resetting driving member is configured to drive the lock catch to be reset from the unlocking position to the locking position.

6. The water cup with the fan according to claim 5, wherein the lock catch comprises an operating part and a latching part; the mounting body comprises a first part and a second part connected to the first part; the first part has the storage slot and a through hole communicated to the storage slot; the second part comprises a first movable slot located on a first side, a second movable slot located on a second side, and a movable hole connected between the first movable slot and the second movable slot; the operating part is movably mounted in the first movable slot and is at least partially connected to the latching part through the movable hole; the latching part is movably mounted in the second movable slot and is capable of extending into the storage slot via the through hole to resist against the fan assembly; the resetting driving member is connected to one end of the latching part that is away from the through hole; one end of the resetting driving member that is away from the latching part resists against a side wall of the second movable slot; the resetting driving member comprises an elastic member; and when the lock catch is in the unlocking position, the elastic member is compressed, so that when an operation on the lock catch is stopped in the unlocked state, the elastic member releases an elastic force to drive the lock catch to move to the locking position.

7. The water cup with the fan according to claim 6, wherein the lock catch further comprises an assembling part; the assembling part is arranged at one end of the latching part that is away from the through hole; and one end of the elastic member is connected to a slot wall of the second movable slot, and another end of the elastic member is connected to the assembling part.

8. The water cup with the fan according to claim 1, wherein the fan assembly partially protrudes out of the storage slot.

9. The water cup with the fan according to claim 1, wherein the storage slot comprises a storage main body part and an extension part communicated to the storage main body part; the fan assembly is detachably arranged on the storage main body part; and the extension part is configured to place fingers of a user to facilitate the user to place and fetch the fan assembly.

10. The water cup with the fan according to claim 1, wherein the fan assembly is detachably arranged in the storage slot through at least one of a magnetic attraction structure, a buckle structure, and a thread structure.

11. The water cup with the fan according to claim 1, wherein the fan assembly comprises a base and a fan head; the base is detachably connected to the cup body; the fan head is movably connected to the base; and the fan head is capable of switching between an unfolded state of being unfolded relative to the base and a folded state of being folded relative to the base.

12. The water cup with the fan according to claim 11, wherein the base and the fan head are rotatably connected.

13. The water cup with the fan according to claim 11, wherein the base is a roughly cylindrical supporting base.

14. The water cup with the fan according to claim 11, wherein the base comprises a supporting base that is folded with the fan head and a handle connected to the supporting base; and the fan assembly is a handheld fan assembly.

15. The water cup with the fan according to claim 11, wherein at least one elastic pad is arranged on one side of the base that is close to the side wall structure.

16. The water cup with the fan according to claim 11, wherein the base comprises a housing, a battery, a circuit board, and a control button; the battery and the circuit board are arranged in the housing; the housing has a surface capable of being folded with the fan head; and the control button is mounted on the surface and is electrically connected to the circuit board.

17. The water cup with the fan according to claim 16, wherein the base further comprises a charging port member electrically connected to the circuit board, and the charging port member is exposed through an opening on the surface.

18. The water cup with the fan according to claim 16, wherein the base further comprises a lighting device; the lighting device is electrically connected to the circuit board; and the lighting device is at least partially exposed through an opening on the surface.

* * * * *